United States Patent
Stowe et al.

(10) Patent No.: US 7,529,444 B2
(45) Date of Patent: May 5, 2009

(54) OPTICAL STEERING ELEMENT AND METHOD

(75) Inventors: Timothy D. Stowe, Alameda, CA (US); Jocelyn Nee, Fremont, CA (US); Asif A. Godil, Milpitas, CA (US)

(73) Assignee: NeoPhotonics, Inc., San Jose, CA (US)

( * ) Notice: Subject to any disclaimer, the term of this patent is extended or adjusted under 35 U.S.C. 154(b) by 0 days.

(21) Appl. No.: 11/807,461

(22) Filed: May 29, 2007

(65) Prior Publication Data

US 2007/0280589 A1    Dec. 6, 2007

Related U.S. Application Data

(63) Continuation of application No. 10/918,572, filed on Aug. 13, 2004, now Pat. No. 7,239,774.

(51) Int. Cl.
*G02B 6/35* (2006.01)
(52) U.S. Cl. .......................................... 385/18; 385/19
(58) Field of Classification Search .................. 385/16, 385/18–19, 22
See application file for complete search history.

(56) References Cited

U.S. PATENT DOCUMENTS

| | | | |
|---|---|---|---|
| 6,721,473 B1 | 4/2004 | Islam | |
| 7,110,635 B2 | 9/2006 | Miller | |
| 2001/0051014 A1 | 12/2001 | Behin | |
| 2005/0117837 A1 | 6/2005 | Cerato | |

*Primary Examiner*—Jerry T Rahll
(74) *Attorney, Agent, or Firm*—Dardi & Associates PLLC; Elizabeth Q. Shipsides

(57) ABSTRACT

A 1×N wavelength selective switch which can function as a dynamic channel equalizer when N=1. In an exemplary arrangement, the present invention is a free-space device that includes a linear array of micromachined reflective elements for beam steering of individual wavelength channels. In at least some embodiments the array of reflective elements of the present invention provides a substantially seamless design such that the optical spectrum appears flat across the transition between actuators. Various embodiments provide high channel bandwidth with flat-top channel performance, low polarization dependence loss, low vibration sensitivity, extinction ratios greater than 40 dB over all temperatures, and very low levels of electrical and optical channel cross-talk.

8 Claims, 35 Drawing Sheets

*Alternative Antenna Comb finger design*

Top view of a free space configuration for a 1xN wavelength switch (functions as a DCE when N=1)

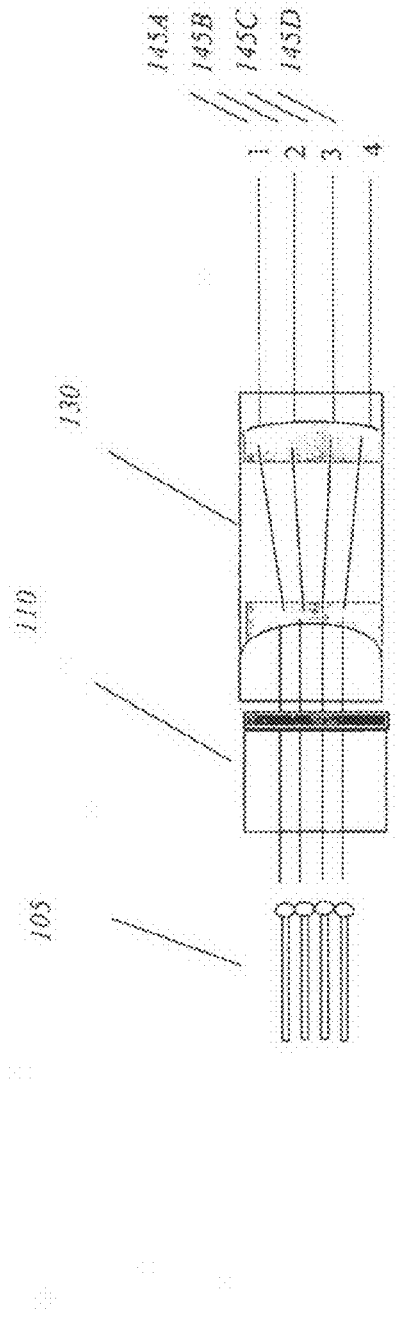
Figure 1B. A side view of subassembly and the light beam array
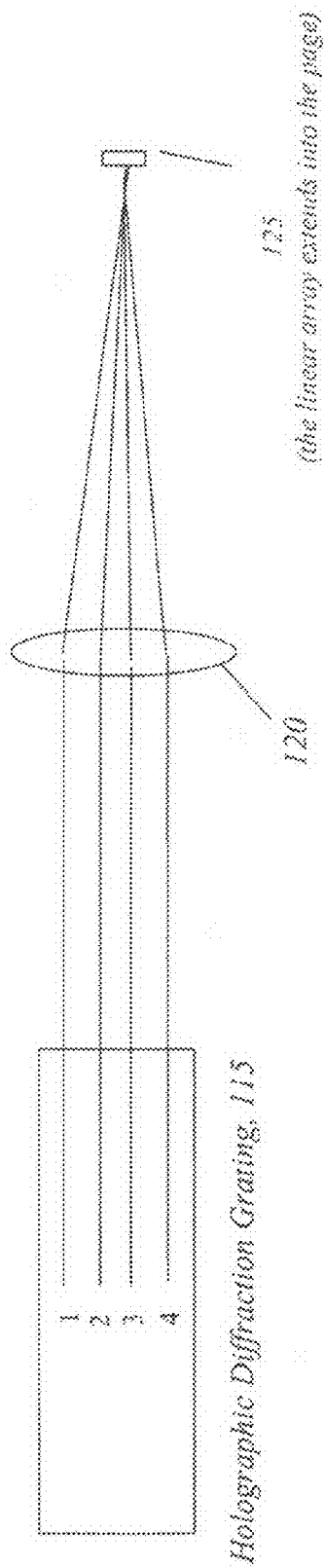
Figure 1C. Side view of subassembly 2 and the light beam arrays for each port.
The return path of each wavelength channel can be steering along the path of any of the four output ports Illustration of a new design using an antenna shaped comb drive.

The isometric view of the folded antenna shaped interdigitated approach

*Depiction of electric fields in the region comprising the interdigitated antenna fingers*

*There is very little pull in the vertical y-direction. The only pull Exists in the x-direction which is a stiff axis*

Alternative Antenna Comb finger design

Figure 6.
*Implementation of alternative antenna comb design*
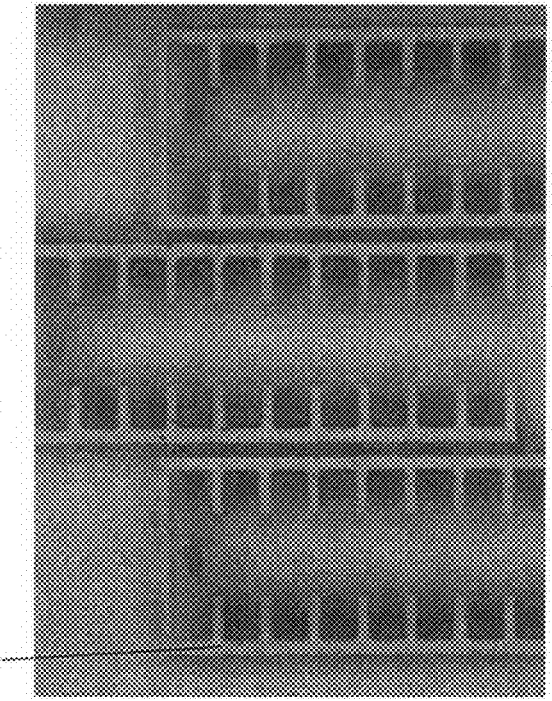
Figure 6B
*Claw shaped stator combs 510 (focused on bottom surface)*
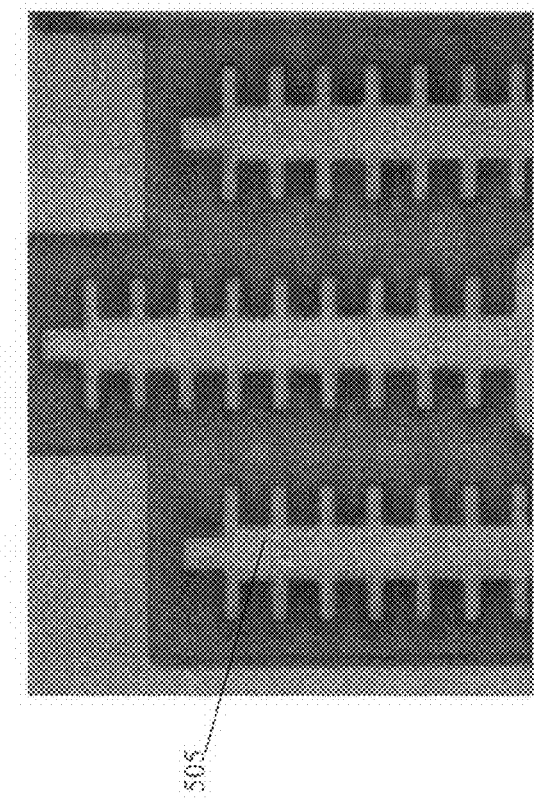
Figure 6A
*Antenna shaped rotor comb 505 fingers mounted on the torsional steering elements*

*The rotor comb fingers are more likely to hit the bottom substrate before hitting each other for small angles of motion.*

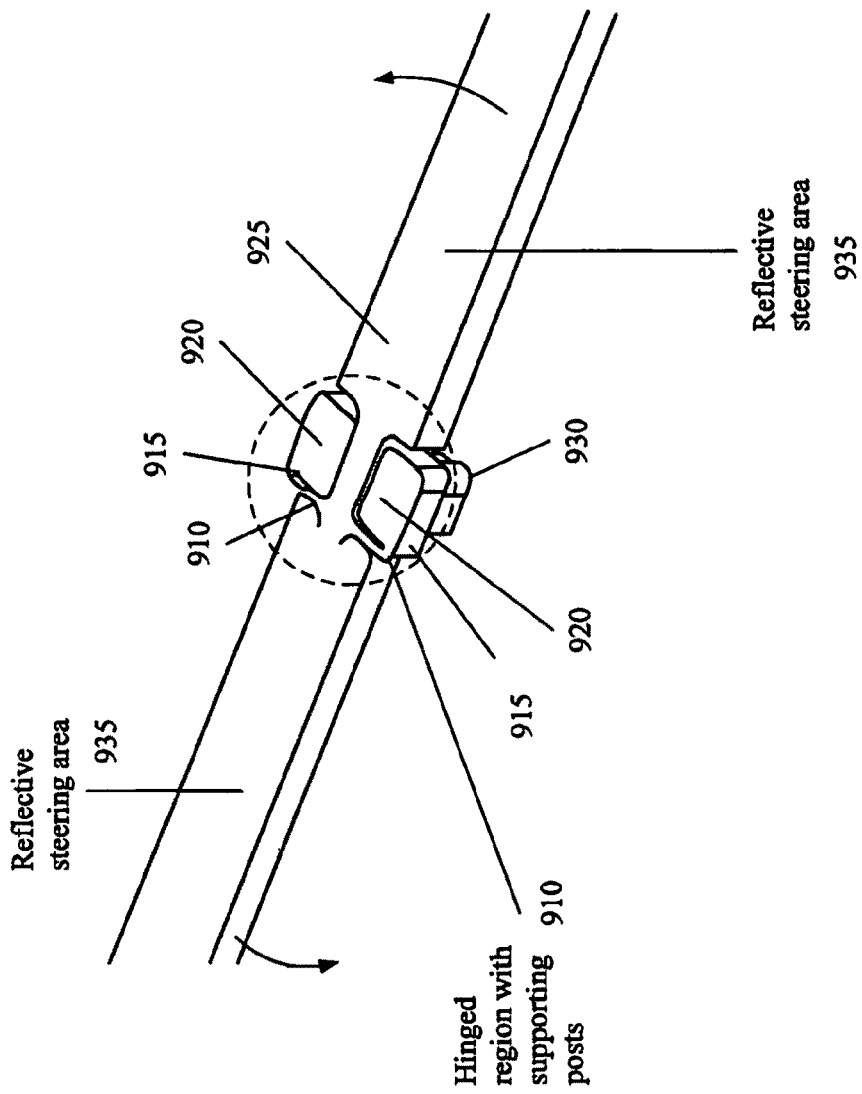
Figure 9A, One steering element with a hinge folded around the post,

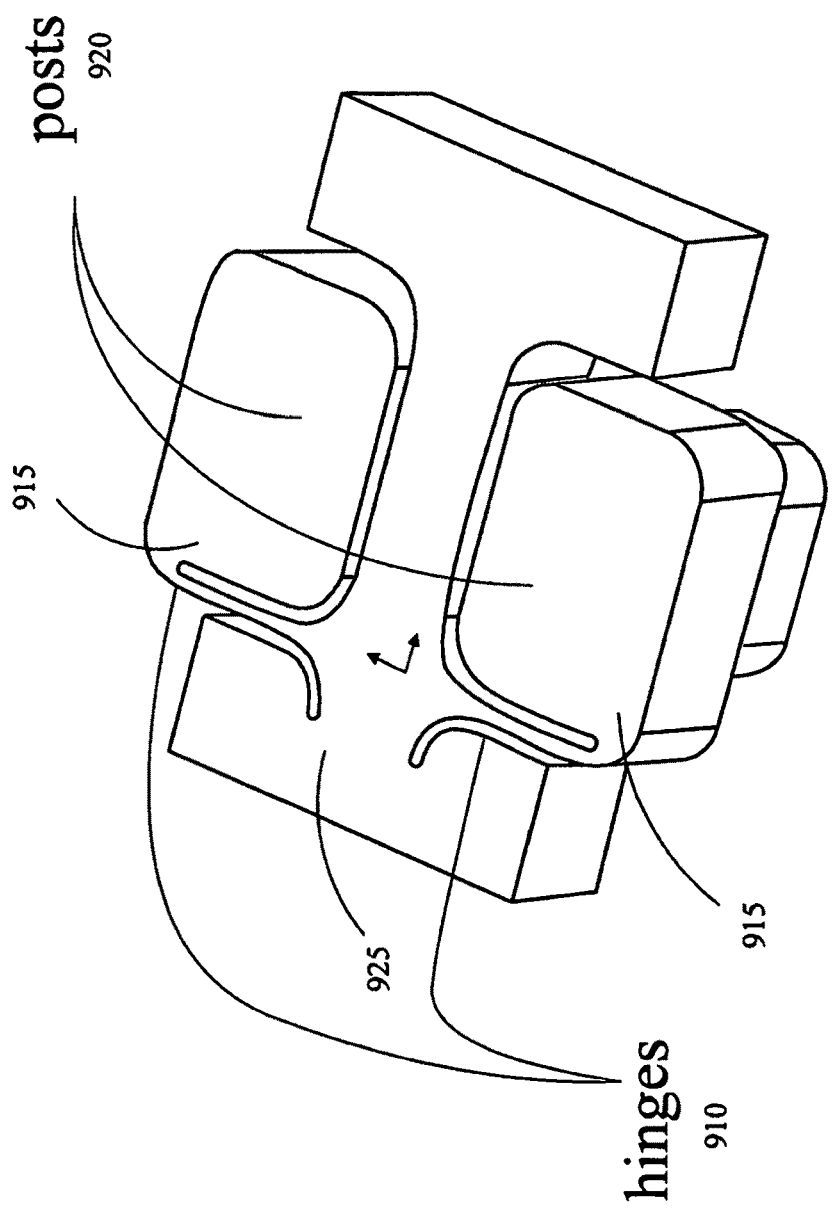
Figure 9B, Blow up of the post/hinge region

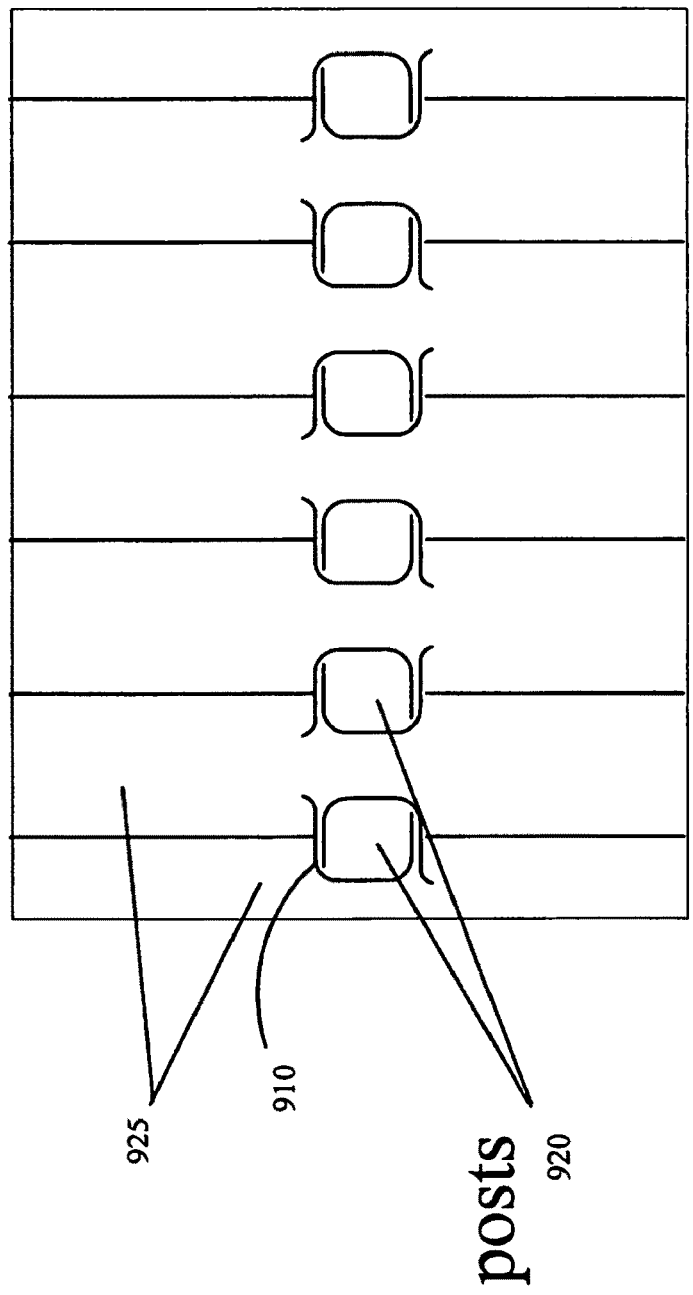
*Figure 10: Array of actuators with hinges folded around the post*

*Folded Hinge Design*

*A large array of contiguous elements*

Alternative folded hinge design

Close up view of the nubs used for restricting lateral shock during manufacturing processes picture of steering array
showing location of nubs for constricting motion

*The MEMS design is compatible simple steering (mirror like) elements and diffrective steering elements*

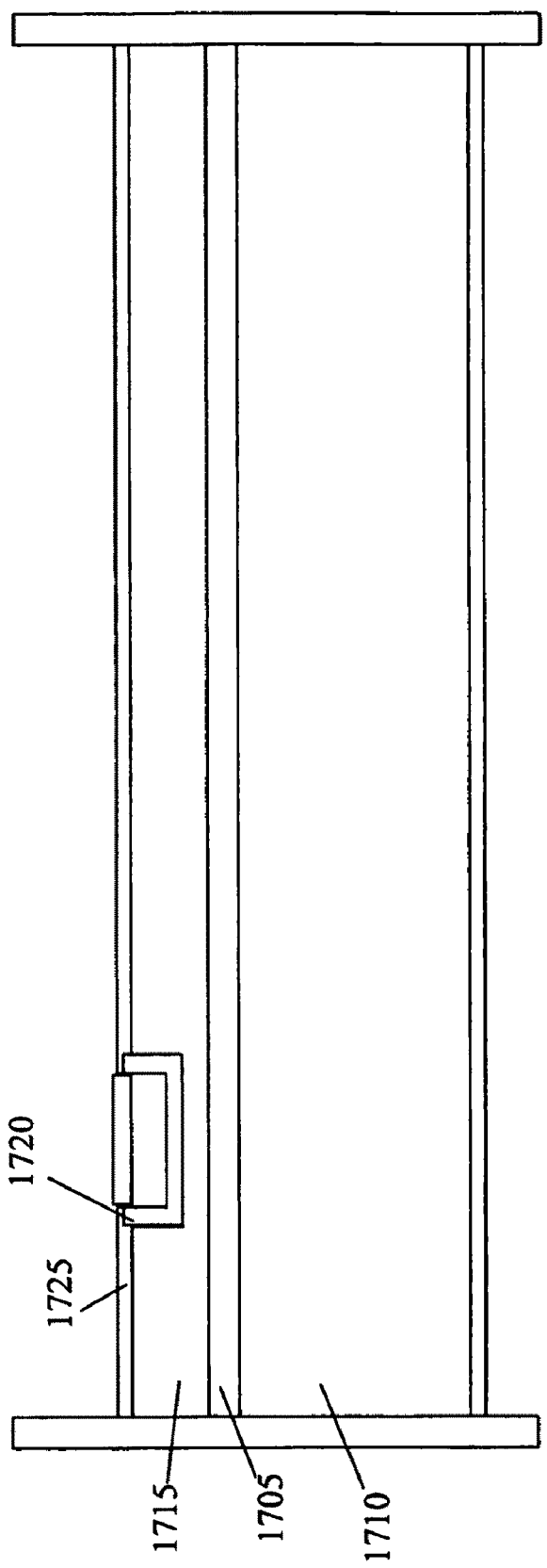

Using patterned resist, form cavity in silicon on insulator in order to define the stator comb fingers, supporting posts, and electrical drive traces for each steering element. Etch stops on oxide. Remove resist after etching. Continue etching to remove the oxide.

Fabrication Process, step 3

Fabrication Process, step 4

Remove top handle including interface oxide

*Etch slots to define rotor combs, hinge, reflective elements and bond pad openings in one step. Etch the oxide on top of stator combs and bond pads using the same mask. Remove resist after etch.*

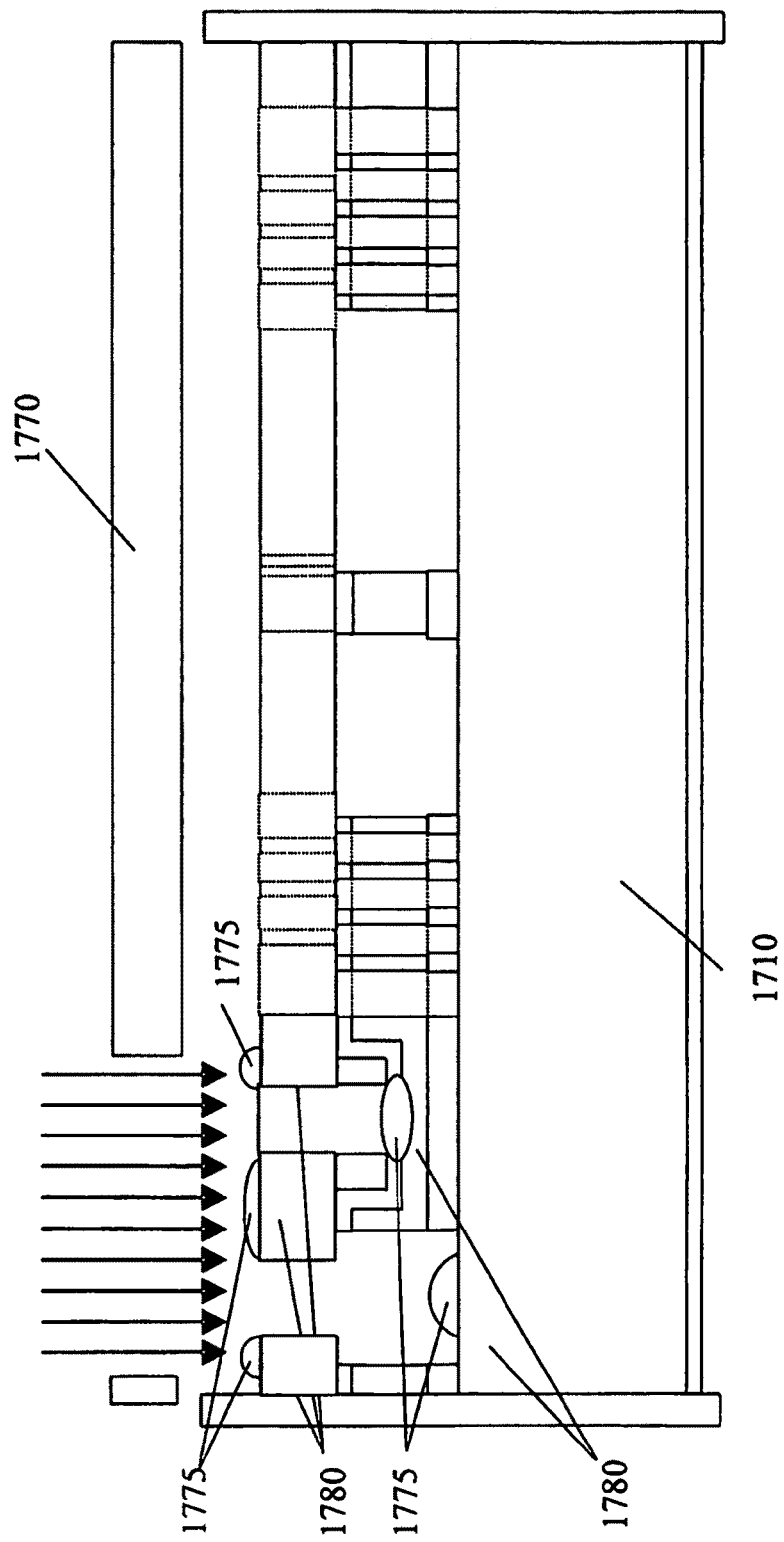
Figure 17H, Deposit Metal for Bond Pads

Deposit Metal for Reflective steering elements

FIG. 19 Liquid Crystal monolithically bonded to steering element array

FIG. 20. Two dimensional steering of the light is required to form a hitless path between ports 1 and 4.

Fig. 21. Side view of structure of a hitless steering element array structure

A cross sectional schematic representation of how the outside actuators induce steering about $\theta_y$ of the center reflector through the bending of the flexural linkages Isometric view depicting how motion about $\theta_x$ is induced by using thermal bimorph actuation to lift the right hand pair of linkages relative to the left hand pair

OPTICAL STEERING ELEMENT AND METHOD

RELATED APPLICATIONS

This application is a continuation of, and claims priority benefit from, U.S. patent application Ser. No. 10/918,572 filed on Aug. 13, 2004 now U.S. Pat. No. 7,239,774 and incorporated herein by reference.

FIELD OF THE INVENTION

The present invention relates generally to optical devices, and more particularly relates to arrays of steering elements for optical applications, including but not limited to Dense Wavelength Division Multiplexed (DWDM) systems and Dynamic/Reconfigurable Optical Add/Drop Modules (OADM), systems which include such arrays, methods for performing such optical switching, and processing methods for fabricating such devices.

BACKGROUND OF THE INVENTION

Dynamic channel equalizers and wavelength selective switches are considered necessary and highly cost-effective building blocks for implementing dynamic wavelength channel equalization, blocking, and switching functions in next generation long haul and metro networks.

A favorite device architecture used in these designs is one that demultiplexes the spectral content of the input light signal into an array of wavelength channels using a free-space diffraction grating. Once separated, each wavelength channel can be modulated or redirected along a different optical path by an intermediate array of control elements. After being manipulated, each of the wavelength channels can be multiplexed back together into one or several output ports by folding the path of the light back upon the same grating or directing the path of light onto another grating of equal dispersion.

When a single fiber optic input and output port is used, the device functions as a dynamic channel equalizer or wavelength blocker. When the light from individual wavelength channels can be redirected toward any of N output ports the device functions as a 1×N wavelength selective switch.

One means known in the prior art for the intermediate manipulation of wavelength channels is to use an array of liquid crystal modulators. Such modulators usually function by changing the polarization state of each wavelength channel and can be used to form a wavelength blocker or a 1×2 wavelength selective switch. While it is possible to extend this approach to higher port counts, this approach is very costly and complicated.

A simpler and more extendible approach to higher port count wavelength routing is to use an array of micromachined reflective mirrors for individual wavelength channel manipulation. Some approaches for achieving this include a mirror array which routes light in each wavelength channel by either changing the angle of the return optical beam or by displacing the path of the return optical beam using mirrors in a paired plane configuration or a paired retro-reflector configuration.

While such wavelength selective switching is extensively mentioned in the prior art, a design for implementing both switching as well as equalization has proven to be neither a simple nor an obvious extension of that art, from a control and design standpoint. In addition to these considerations, the prior art has failed to address adequately other performance criteria including high channel bandwidth with flat-top channel performance, low polarization independence loss, low vibration sensitivity and therefore high resonant frequency steering elements, high extinction ratios greater than 40 dB, and very low levels of electrical and optical channel cross-talk.

Furthermore, some DWDM applications require wavelength selective switching with seamless optical performance in the spectral region in between adjacent wavelength channels with frequency spacing typically set at 50 GHz or 100 GHz on the ITU grid. Whereas present liquid crystal modulator arrays offer seamless spectral performance in the non-blocking state, micromachined arrays of actuators typically have dips in insertion loss in between the actuator channels. In these regions chromatic dispersion and polarization depended loss (PDL) are often uncontrolled. The existence of the dips also reduces the effective usable bandwidth associated with each actuator and impose the limitation that each actuator must have a one-to-one correspondence to each wavelength channel. This can limit the flexibility of such a device when larger or smaller spectral spacing is required. While a wavelength blocker based upon diffractive micromachined ribbon elements does offer seamless performance across the telecom spectral band, it is difficult to build a wavelength switching device with higher port counts (N>1) based upon this technology, as it is difficult to collect light from the higher order diffracted modes and redirected in an efficient manner into additional ports with low insertion loss.

Thus a new type of actuator array is needed which can efficiently redirect spectrally separated light towards multiple output ports with near spectrally seamless performance.

SUMMARY OF THE INVENTION

The present invention provides a 1×N wavelength selective switch which can function as a dynamic channel equalizer when N=1. In an exemplary embodiment, the switch of the present invention is a free-space device that includes a linear array of micromachined reflective elements for beam steering of individual wavelength channels.

Furthermore, in at least some embodiments the array of reflective elements of the present invention provides a substantially seamless design; that is, the portion of the spectrally separated light beam impinging on the gap between two adjacent actuators gets redirected to the same output position with the same level of attenuation as the spectral component which lands directly on adjacent actuators positioned to the same angle. Thus the optical spectrum appears flat across the transition between actuators.

To achieve the foregoing, particular attention has been paid to the optical design and the micromechanical elements for steering the light beam. As a result, the design of the present invention provides, in at least some embodiments, beam steering elements that provide high channel bandwidth with flat-top channel performance, low polarization dependence loss, low vibration sensitivity, extinction ratios greater than 40 dB over all temperatures, and very low levels of electrical and optical channel cross-talk.

THE FIGURES

FIG. 1B is a detailed side view of Subassembly 1 shown in FIG. 1A

FIG. 1C is a detailed side view of Subassembly 2 shown in FIG. 1A.

FIGS. 6A and 6B illustrate aspects of the alternative design shown in FIG. 5, wherein FIG. 6A shows antenna shaped rotor fingers and FIG. 6B shows claw shaped stator fingers.

FIG. 9A shows a single actuator with a hinge folded around supporting posts. (The comb figures at the end of the actuator are outside the drawing area).

FIG. 9B is an enlarged illustration of the hinge and post region shown in FIG. 9A.

FIG. 10 is a top view showing an array of micromechanical steering elements with folded hinges in accordance with one aspect of the present invention.

FIGS. 17A-I illustrate the process for forming an actuator array.

Figure 18:
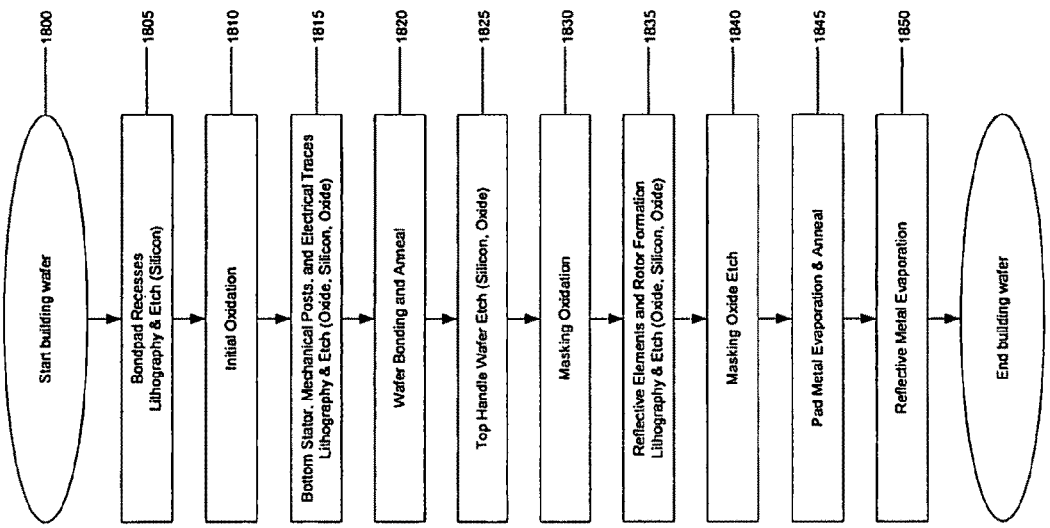

FIG. 18 shows an outline of the entire process flow.

Figure 19:
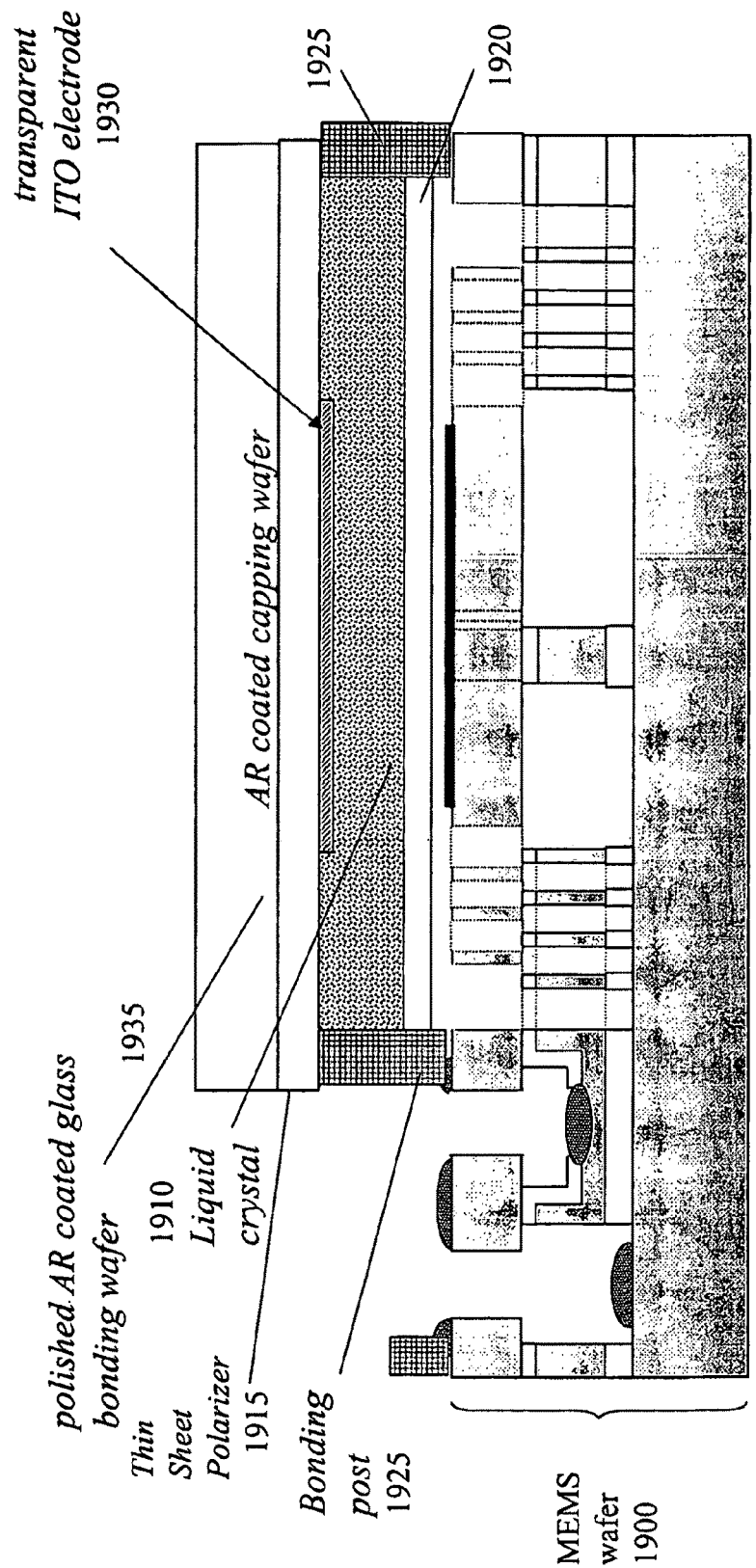

FIG. 19 shows an internal elevational view of a finished steering element with a liquid crystal cell sandwiched between the glass wafers which are monolithically bonded to this steering element so that light can be independently blocked in strength while it is steered in angle. Optionally, a thin sheet polarizer can be placed above or below the liquid crystal.

Figure 20:
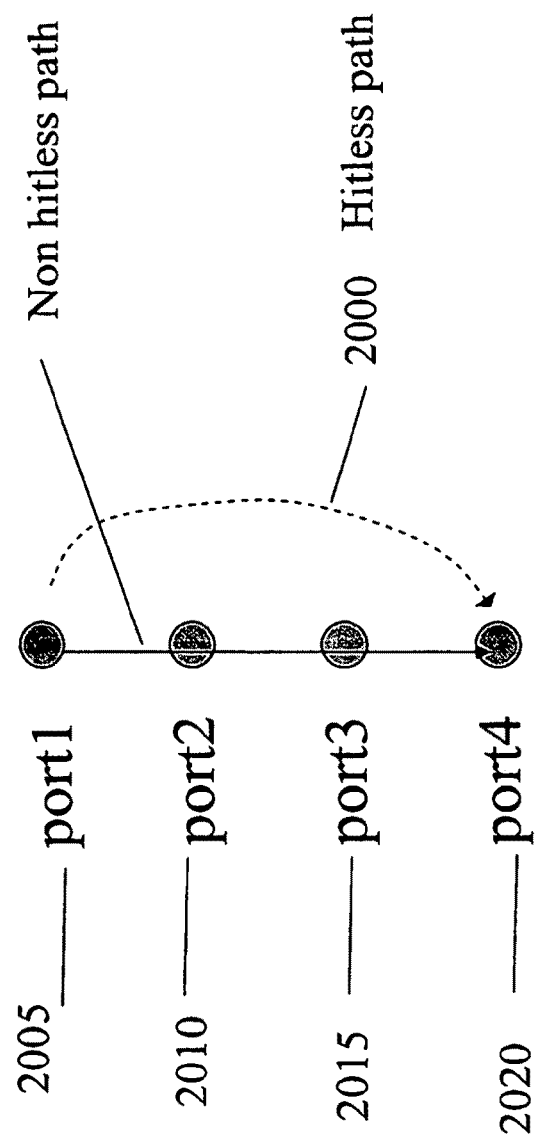

FIG. 20 shows in schematic diagram form a representation of the output spot location of the light as its path is steered between ports 1 and 4. A hitless path requires the ability to steer the light along two orthogonal directions in order to avoid ports 2 and 3.

Figure 21:
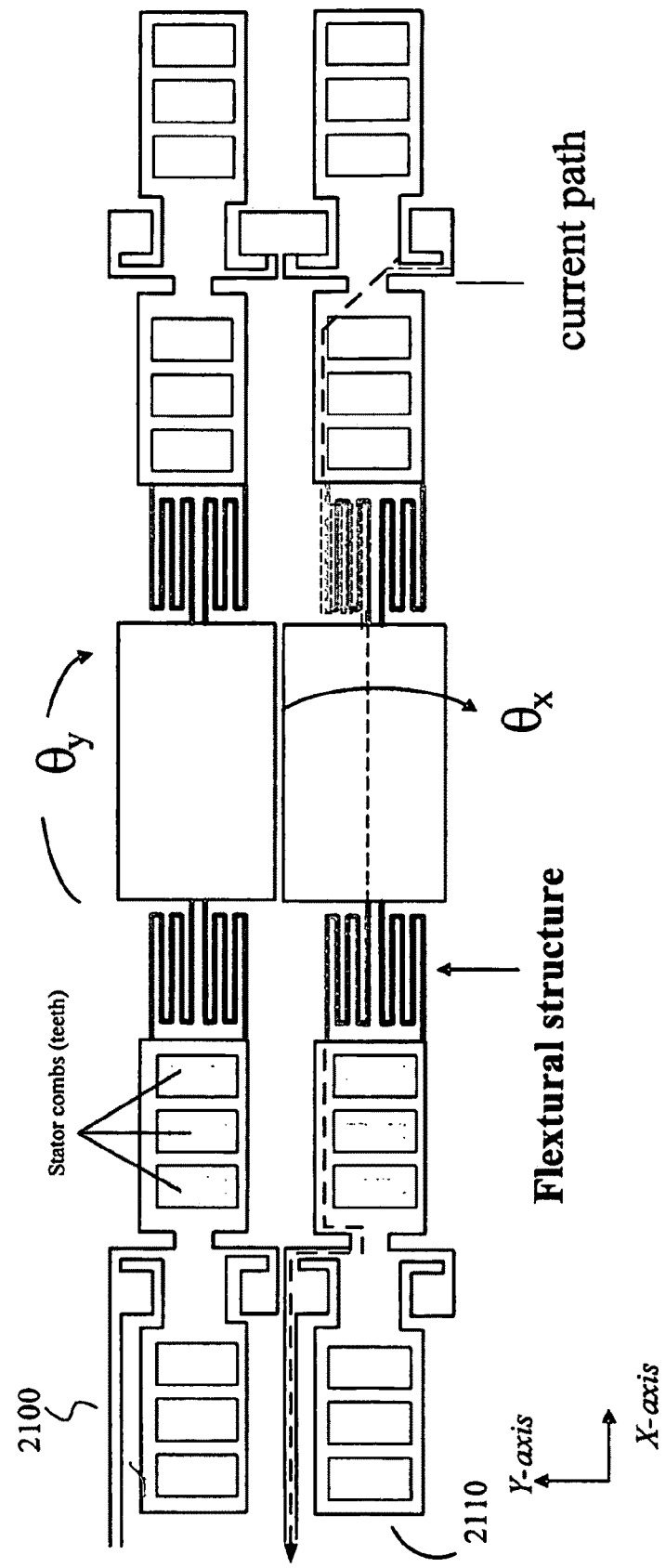
Figure 22:
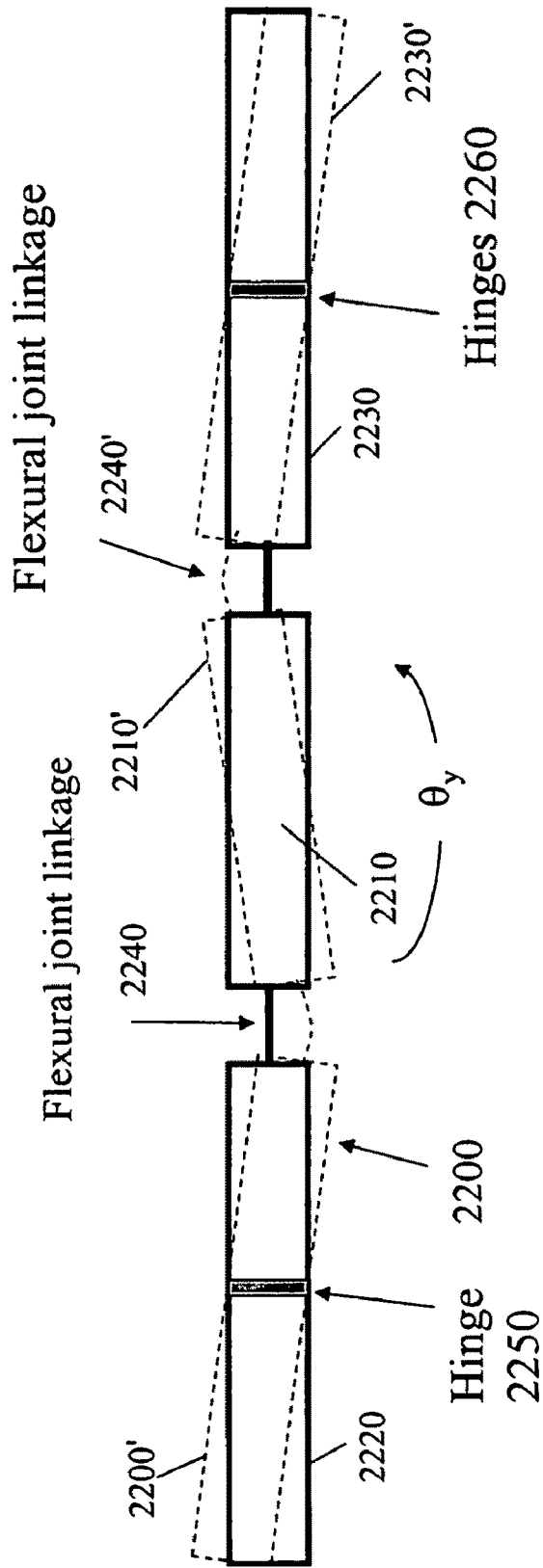
Figure 23:
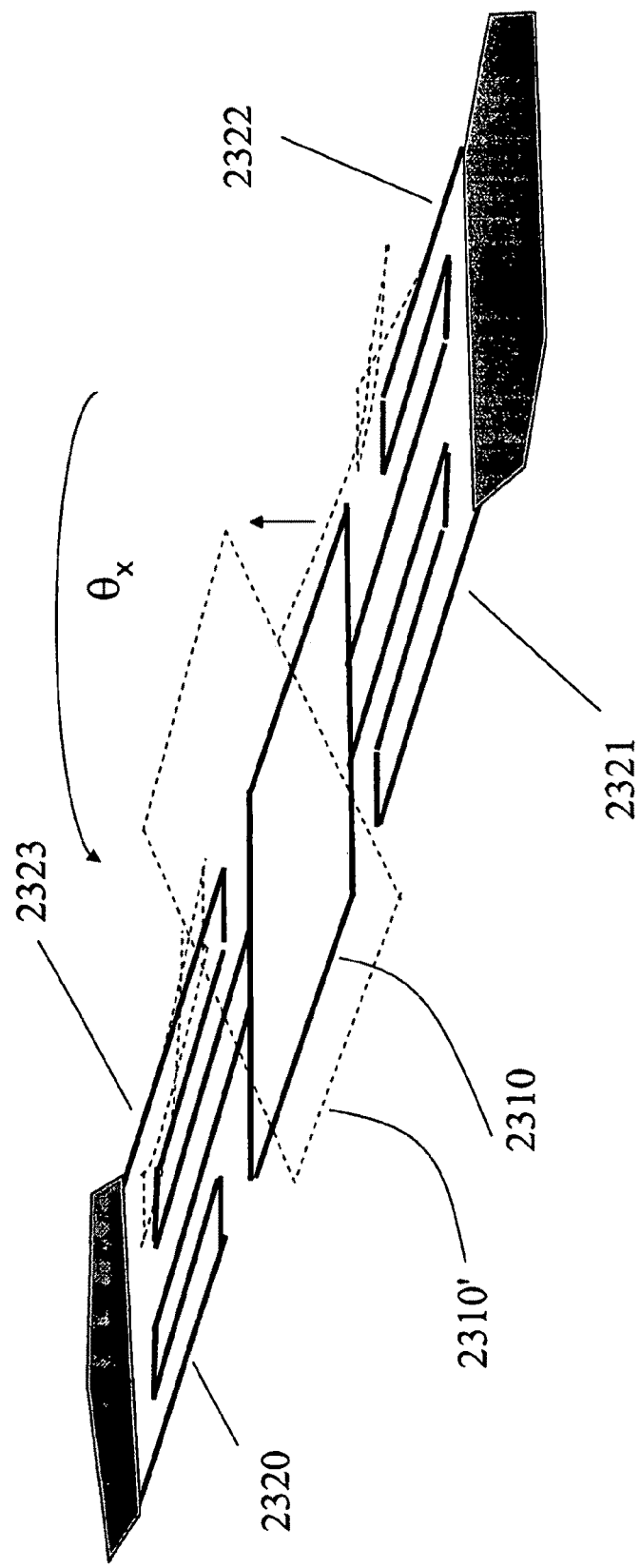

FIG. 21 depicts a top view of a steering element with the capability to steer light along both $\theta_x$ and $\theta_y$ angular directions FIG. 22 schematically depicts how motion in the $\theta_y$ direction of the central reflector is achieved FIG. 23 is an isometric view illustrating how motion along the $\theta_x$ direction is achieved.

Figure 24:
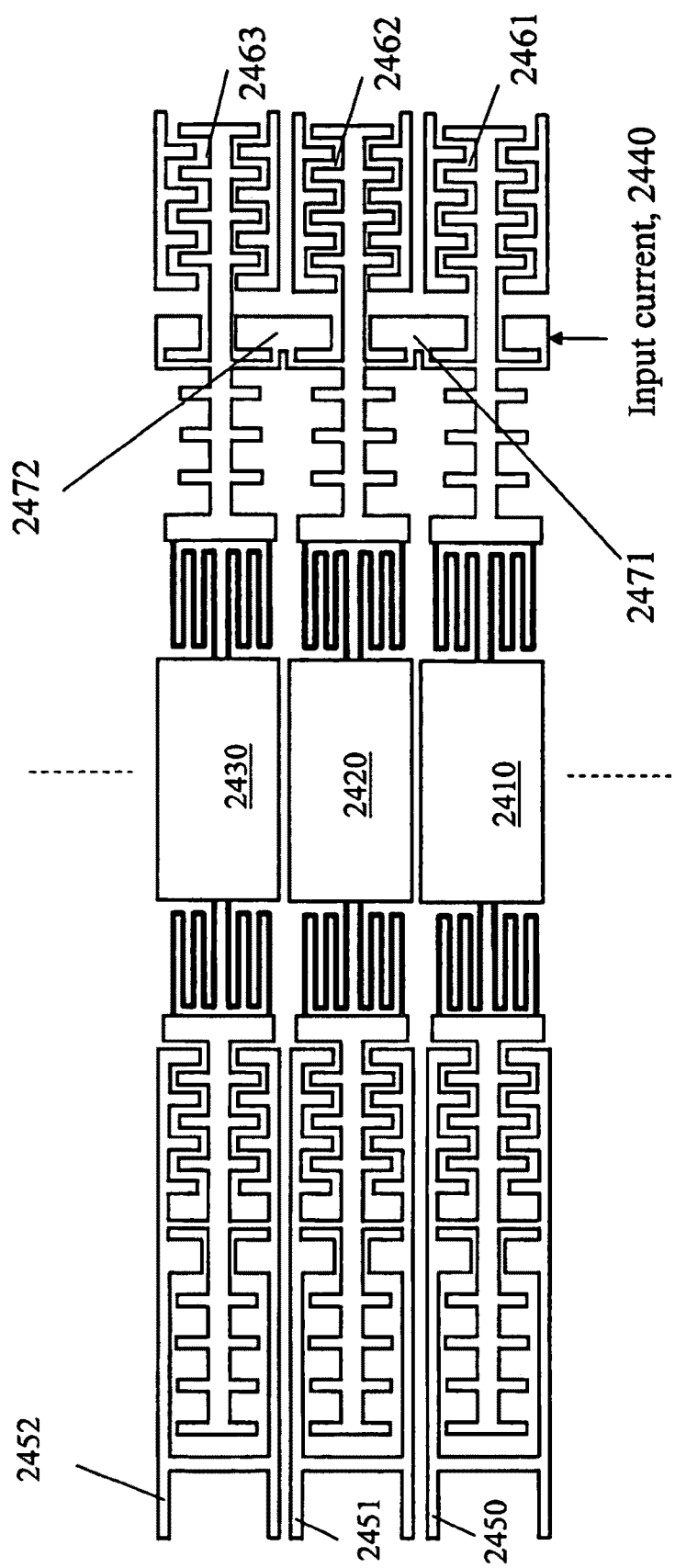
Figure 18:
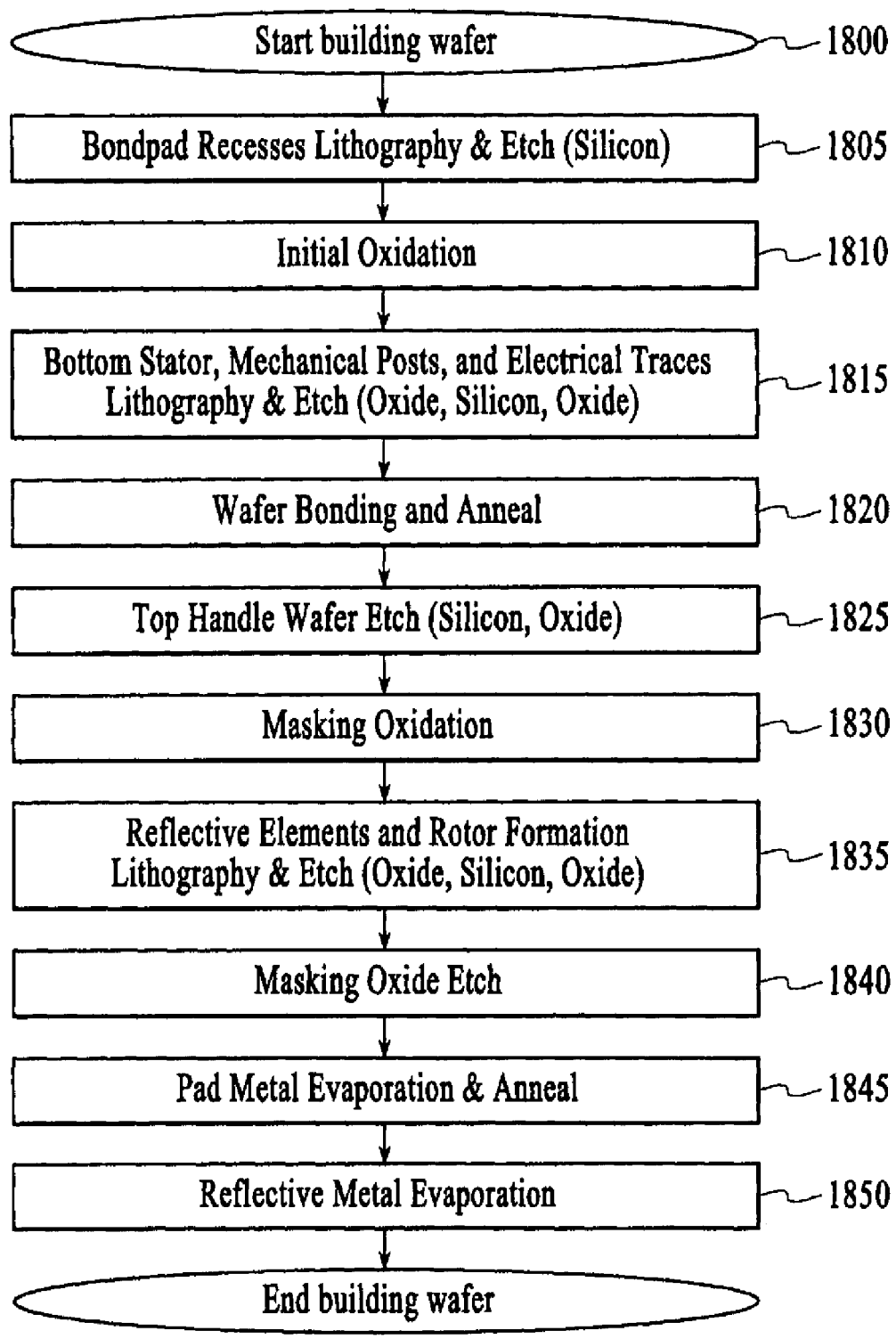

FIG. 24 depicts three biaxial steering elements placed contiguously next to each other.

DESCRIPTION OF THE PREFERRED EMBODIMENTS

The present invention overcomes many of the limitations of the prior art by providing a substantially integrated solution for dynamically attenuating, spectrally equalizing, and switching individual wavelengths on the ITU grid using a free space, optically transparent architecture. In addition, the present invention provides ready expandability for achieving dynamic control with increasing channel counts and bandwidth requirements. In particular, these features are illustrated in the context of an embodiment of the invention in a 1×N channel-based optical switch capable of increased channel count operation and equalization without significant operational impairment.

In addition, the present invention provides a set of actuators that are so closely spaced, they have very little residual inter-channel dips in the frequency domain and in at least one embodiment may allow seamless operation in the frequency domain. In other words, at least some embodiments of the present invention provide a system where, if every actuator were set to produce the same attenuation, the entire attenuation spectrum would be flat. Such a seamless system makes the effects of dead space inconsequential and reduces or eliminates concerns about pixelation.

Figure 1A:
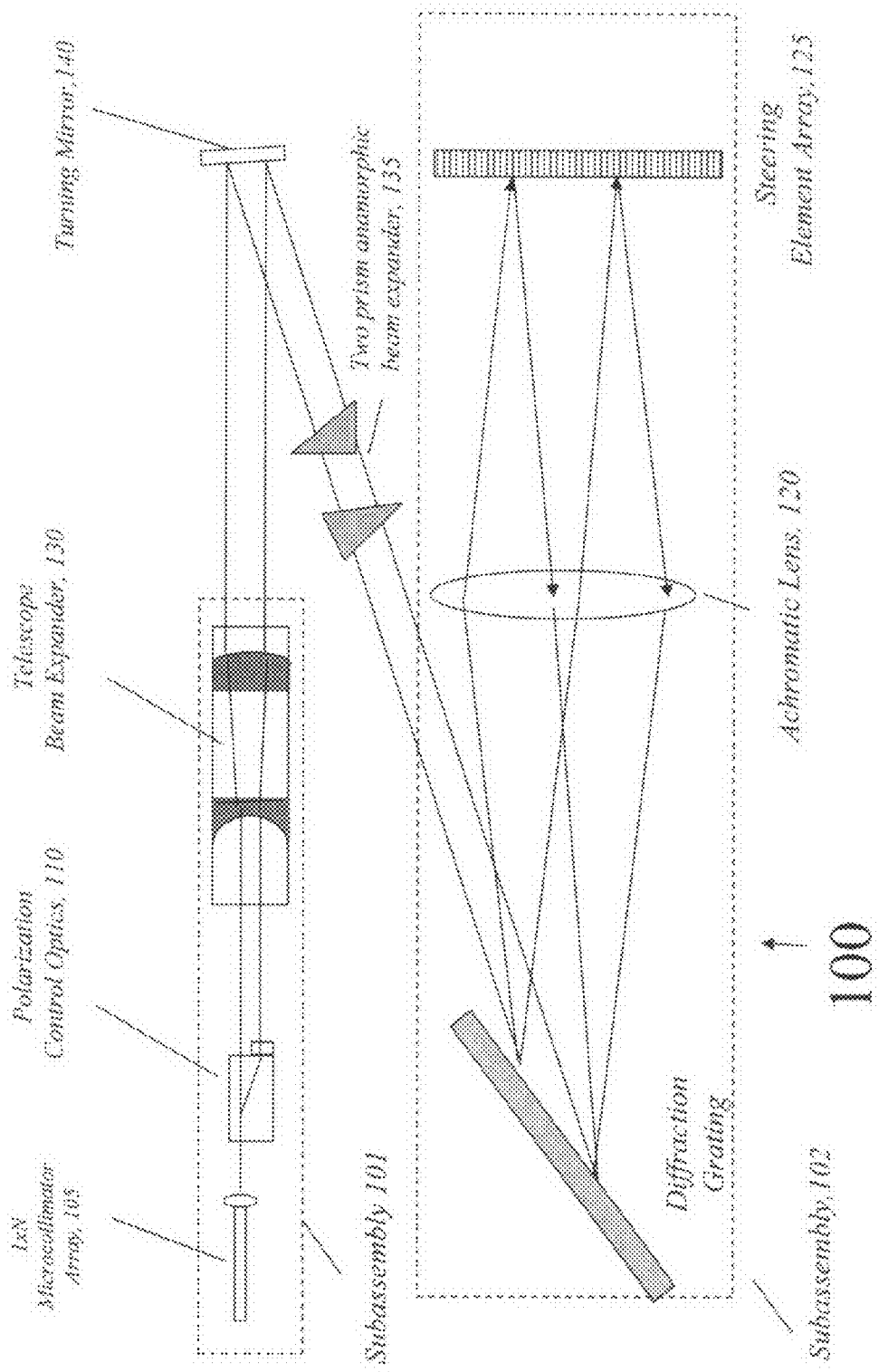
FIG. 1A is a schematic diagram of an exemplary embodiment used for forming a dynamic channel equalizer and/or a wavelength selective switch with equalization and blocking capabilities.

Referring first to FIGS. 1A-1C, a generalized top plan view of one embodiment of a system according to the present invention can be appreciated where that system can be used as a free-space dynamic channel equalizer or wavelength selective switch. In particular, FIG. 1A illustrates an exemplary system 100 comprised, for purposes of discussion only, of two subassemblies 101 and 102. The system 100 includes an input in the form of a 1×N collimator array 105, polarization control optics 110, a wavelength dispersion device 115 such as a diffraction grating, an achromatic lens 120, and a steering element array 125. In addition, in some embodiments it may be desirable to include a telescopic beam expander 130, and/or an anamorphic beam expander 135, and possibly a turning mirror 140, which functions primarily to reduce the physical length of the device relative to the length of the optical path. The turning mirror 140 may be angle adjusted over temperature, such as disclosed in co-pending U.S. patent application Ser. No. 10/915,524, filed Aug. 9, 2004, entitled Heat Actuated Steering Mount for Maintaining Frequency Alignment in Wavelength Selective Components for Optical Telecommunications, attorney docket no. 014982/0301809, Express Mail Label No: EV382010549US, commonly assigned and incorporated in full herein by reference. The steering element array 125 may be, for example, a micromachined linear array of reflective elements for beam steering of individual wavelength channels.

Referring particularly to FIG. 1B, this diagram shows a side view of subassembly 101. A 1×N array of optical ports 105 can function as an input or an output port and is shown as a 1×4 array for illustrative purposes only. The optical signal from each of these ports first passes through polarization conditioning by means of polarization control optics 110, and optional beam expansion optics 130. This yields a separate output path 145A-D for each beam, at which point the beams are fully conditioned and are passed to subassembly 102, shown in FIG. 1C. Then, each beam is separated into individual wavelengths using a diffraction grating 115. After being separated, the individual wavelength channels are collimated and focused by means of lens 120 onto an array of steering elements 125. As shown in FIG. 1C, such steering elements 125, discussed in greater detail hereinafter, allow the individual wavelength channels to be redirected to any one of the output optical ports.

Figure 2:
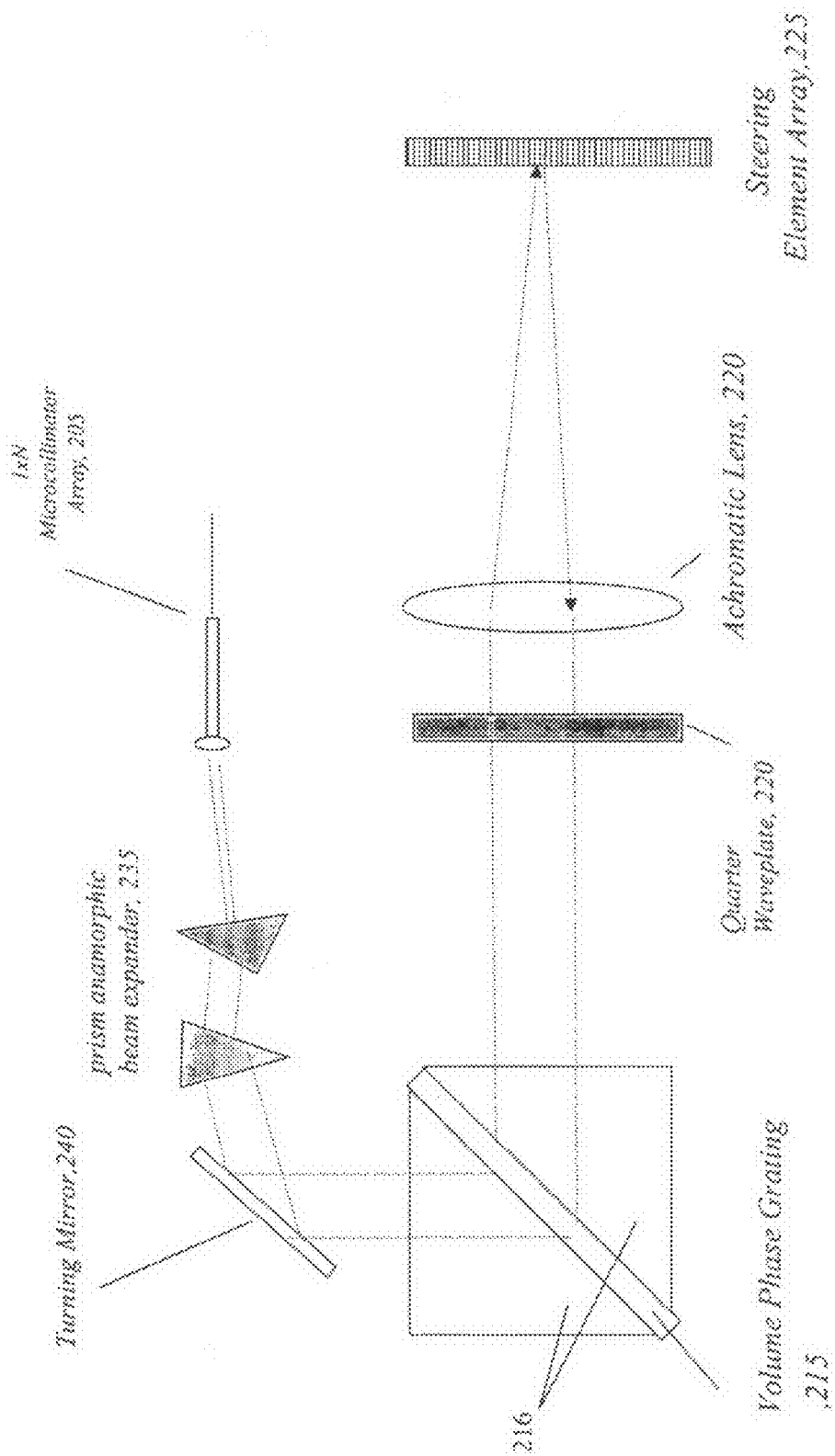
FIG. 2 is a schematic diagram of another exemplary embodiment used for forming a wavelength selective switch with equalization and blocking capabilities.

FIG. 2 shows an alternative embodiment to FIG. 1 where the diffraction grating used is a transmission volume phase diffraction grating 215 with two prisms 216 attached to the input and output faces of the grating. Such gratings offer an advantage in some embodiments because they can be made with high efficiencies for both polarizations. Polarization dependent loss from the grating can further be reduced by using a quarter-wave plate 220 to rotate incoming and outgoing polarizations by 90 degrees after a double pass through the quarter-wave plate. This eliminates the need for the separate polarization control optics 110 discussed in connection with FIG. 1. Because the input path length of the light from the collimator array to the grating can be made much shorter in this design, the telescopic beam expander 130 shown in FIG. 1 can be eliminated. An anamorphic beam expander 235 is still useful in some embodiments to achieve high spectral resolution. However, the dependence of a volume phase grating line count with temperature and the index of refraction change of the prisms with temperature leads to much more temperature dependence of the grating-prism system. A turning mirror 240, whose angle can be controlled as a function of temperature to change the input angle of light into the grating, can compensate for these effects. The mount and mirror arrangement disclosed in the above-referenced U.S. patent application Ser. No. 10/915,524 filed Aug. 9, 2004, entitled Heat Actuated Steering Mount for Maintaining Frequency Alignment in Wavelength Selective Components for Optical Telecommunications, attorney docket no. 014982/0301809, Express Mail Label No: EV382010610US, is suitable for this purpose.

It has been determined that performing both equalization and switching functions simultaneously requires special attention to both the design of the micromechanical elements and the spacing of the input/output fibers of a 1×N port array. One means of providing equalization is to adjust the path of the return light so that the return Gaussian beam is shifted slightly so as to reduce the overlap with the optimized path thereby providing additional loss and a means of attenuating the signal. This solution requires smooth drift free continuous analog control of the steering elements that is controlled with a high bit count DAC.

Over the length of the actuation array, it has been determined that it is desirable to have as little optical dead space as possible between individual adjacent actuators corresponding to each wavelength channel. Reducing this dead space maximizes the useful bandwidth for sending 10 Gbits/s or even 40 Gbits/s data through each channel as well as reducing the frequency alignment tolerance of optical sources to the ITU grid. Therefore, in order to build an efficient DWDM system, it has been found desirable to have this optical dead space correspond to a small fraction of the total bandwidth separating adjacent channels on the ITU grid.

However, as the size and spacing of adjacent actuators is reduced, adjacent elements become more susceptible to cross talk. For best performance, cross talk should be minimized between adjacent channels so that data traveling on adjacent channels do not interfere. When channels are close together, dynamic interference from squeeze film air/nitrogen damping is an important issue. To eliminate the effect of squeezed film air damping, transitions in the drive voltages are, for at least some embodiments, slowed down to a rate less than the natural time constant of the micromechanical steering elements. Slowing the actuators down has the added benefit of dramatically reducing overshoot and ringing effects. Correspondingly, it has been found to be helpful to design steering elements with a high mechanical frequency because this frequency limits the switching speed. Another reason it is useful for the steering elements to have a high resonant frequency is to improve their immunity from opto-mechanical noised generated by in-situ vibrations. It has also been found desirable, for improved performance of the array of steering elements, to include uniformity in the actuation response across the array, as well as minimization of hysteretic behavior, drift over temperature, and aging effects.

Figure 3A:
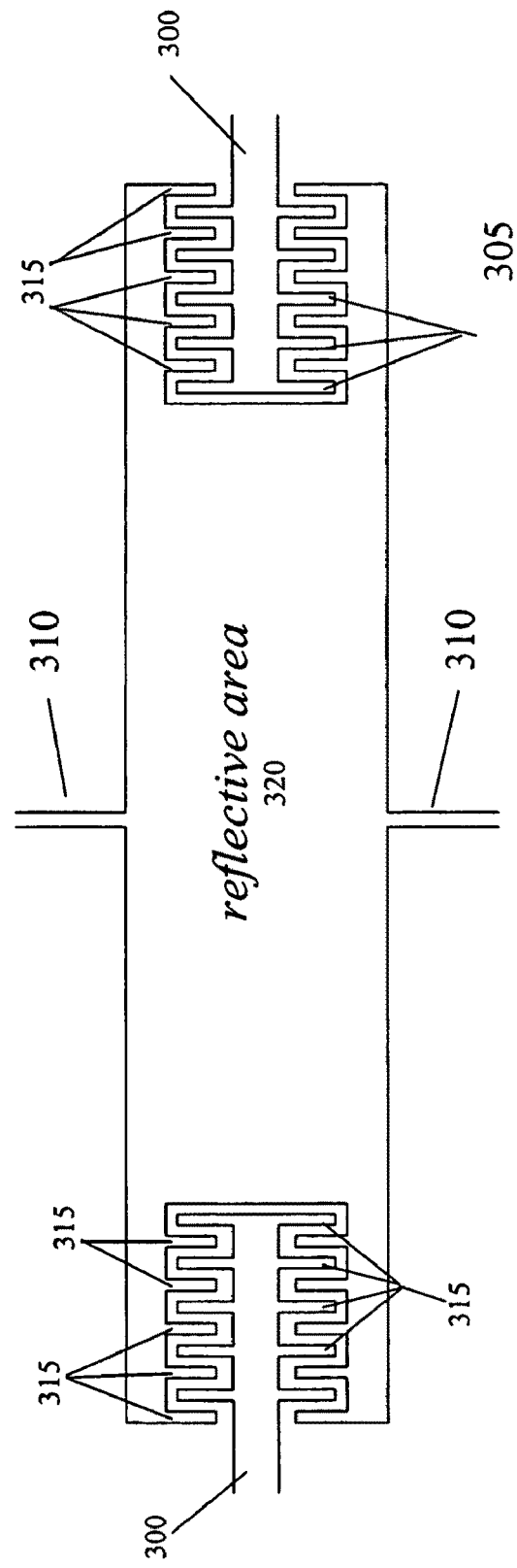
FIG. 3A is a top view showing an exemplary arrangement of one aspect of the present invention in which interdigitated electrode fingers are folded parallel to the axis of rotation. The stator electrode fingers are arranged in an antenna shape and the rotor fingers surround the stator fingers.
Figure 3B:
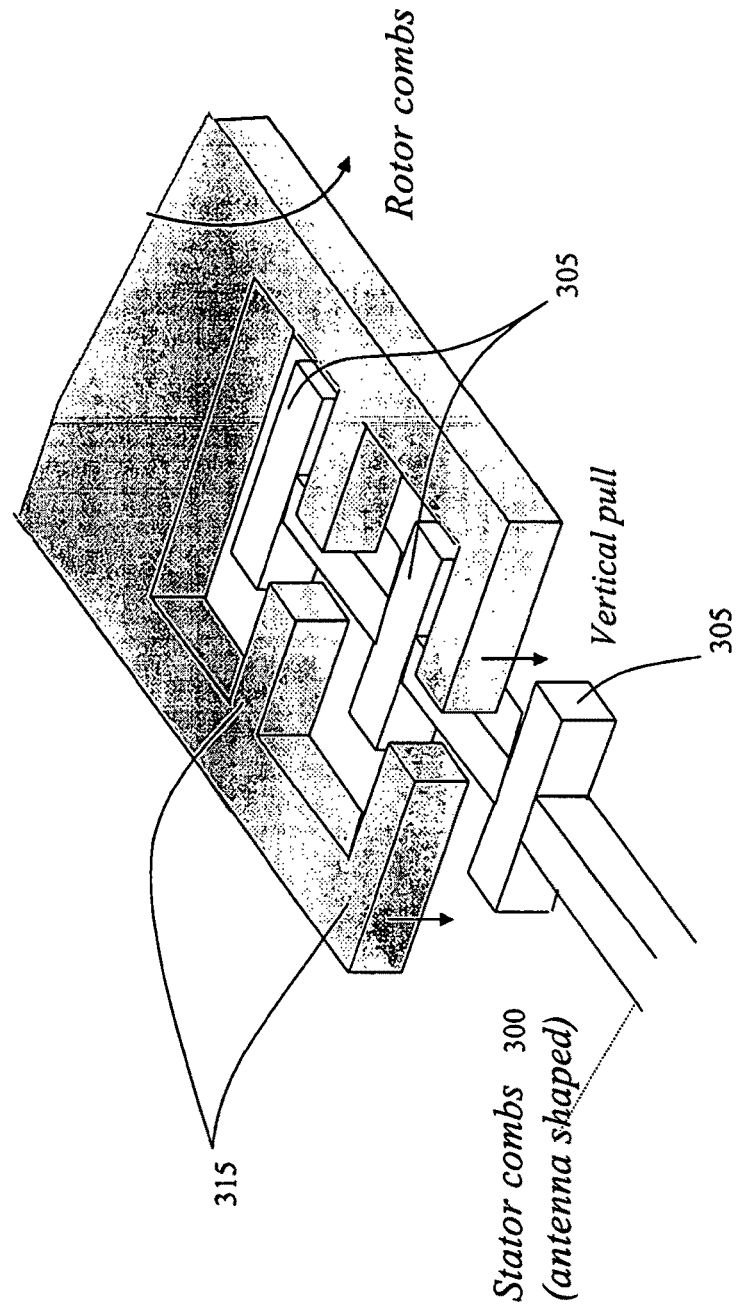
FIG. 3B is an isometric view of the electrode arrangement of FIG. 3B and illustrates the vertical offset between the stator and rotor fingers in one illustrative embodiment.
Figure 4:
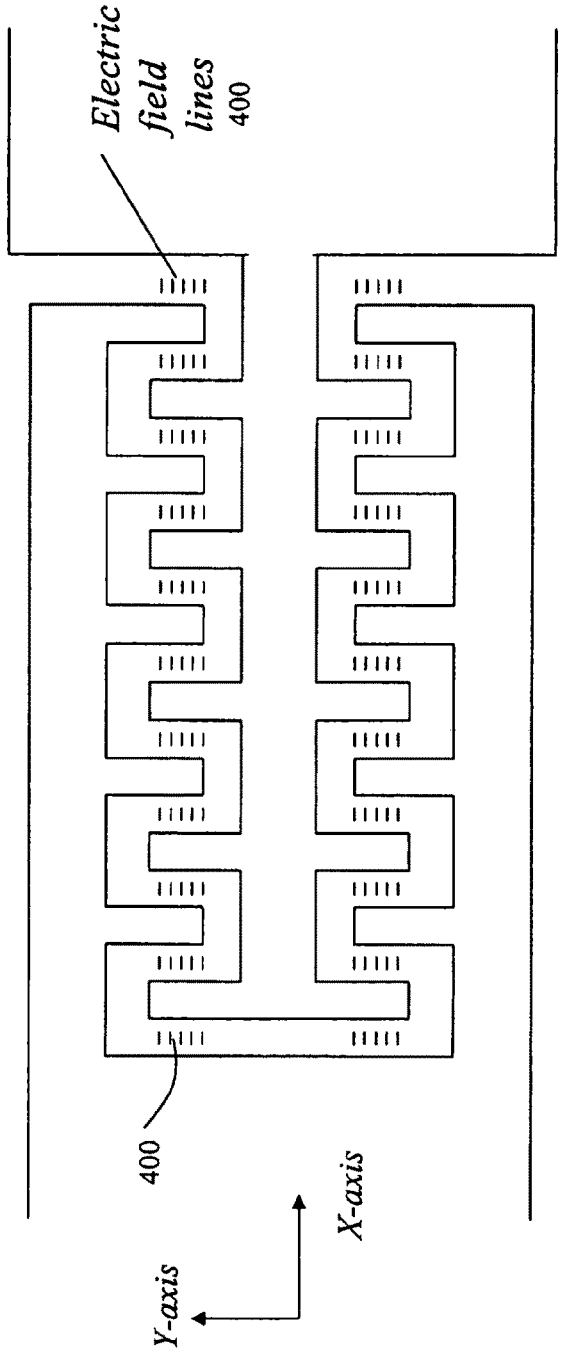
FIG. 4 is a top view depicting the concentration of electric field lines for the embodiment shown in FIGS. 3A-3B.

FIGS. 3A and 3B illustrate in plan view and isometric view, respectively, an exemplary arrangement of a steering element in accordance with one aspect of the present invention in which a stator comb indicated generally at 300 is arranged as a plurality of stator electrode comb fingers 305. The fingers 305 are organized in an "antenna" geometry such that the stator electrode comb fingers lie principally parallel to the hinge of rotation, shown in FIG. 3A at 310, and are interdigitated with a plurality of rotor electrode comb fingers 315 which are formed integrally with a reflective element 320. The torsional hinges 310 can be seen to be attached substantially at the centerline of the reflective element 320. As shown in FIG. 4, this arrangement of stator electrode fingers 305 and rotor electrode comb fingers 315 confines the majority of the in-plane electric field lines 400 along the x-axis so that very little if any forces are present along the y-axis, thus minimizing the risk of lateral twisting.

Figure 5:
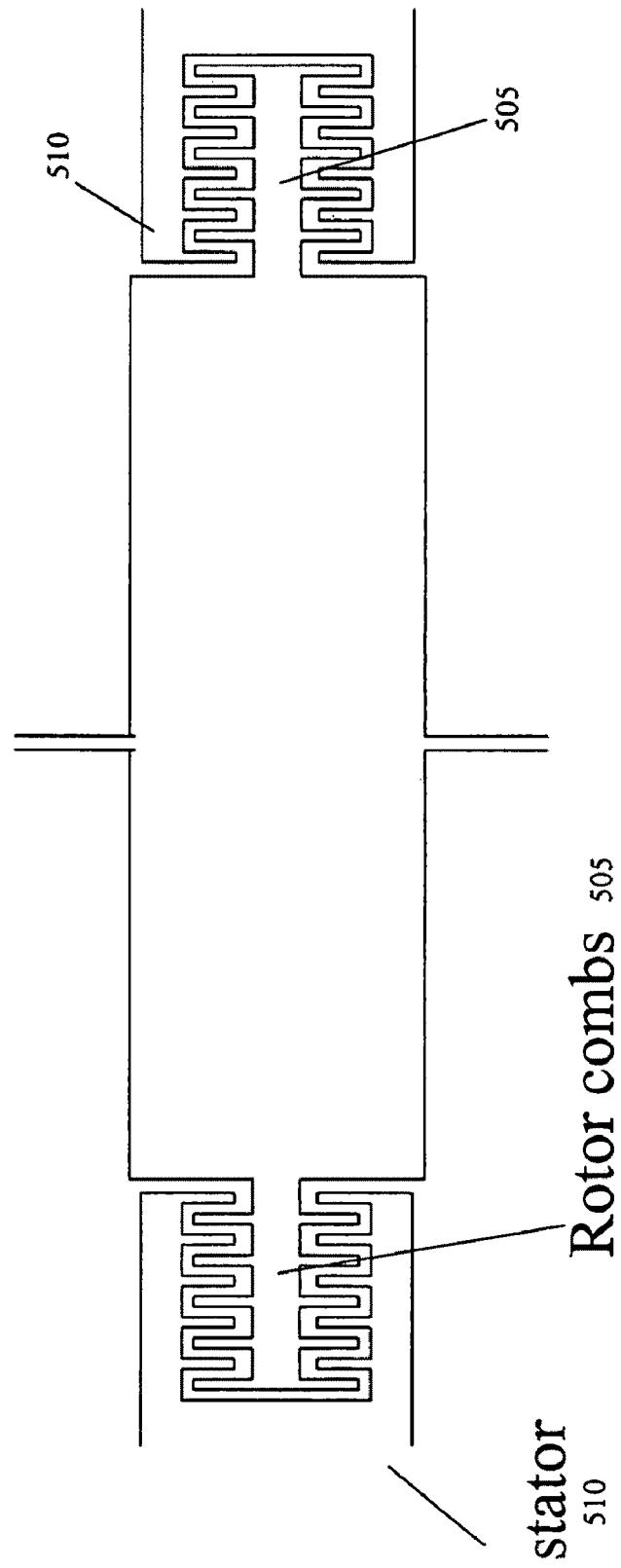
FIG. 5 illustrates an alternative comb finger design.
Figure 7:
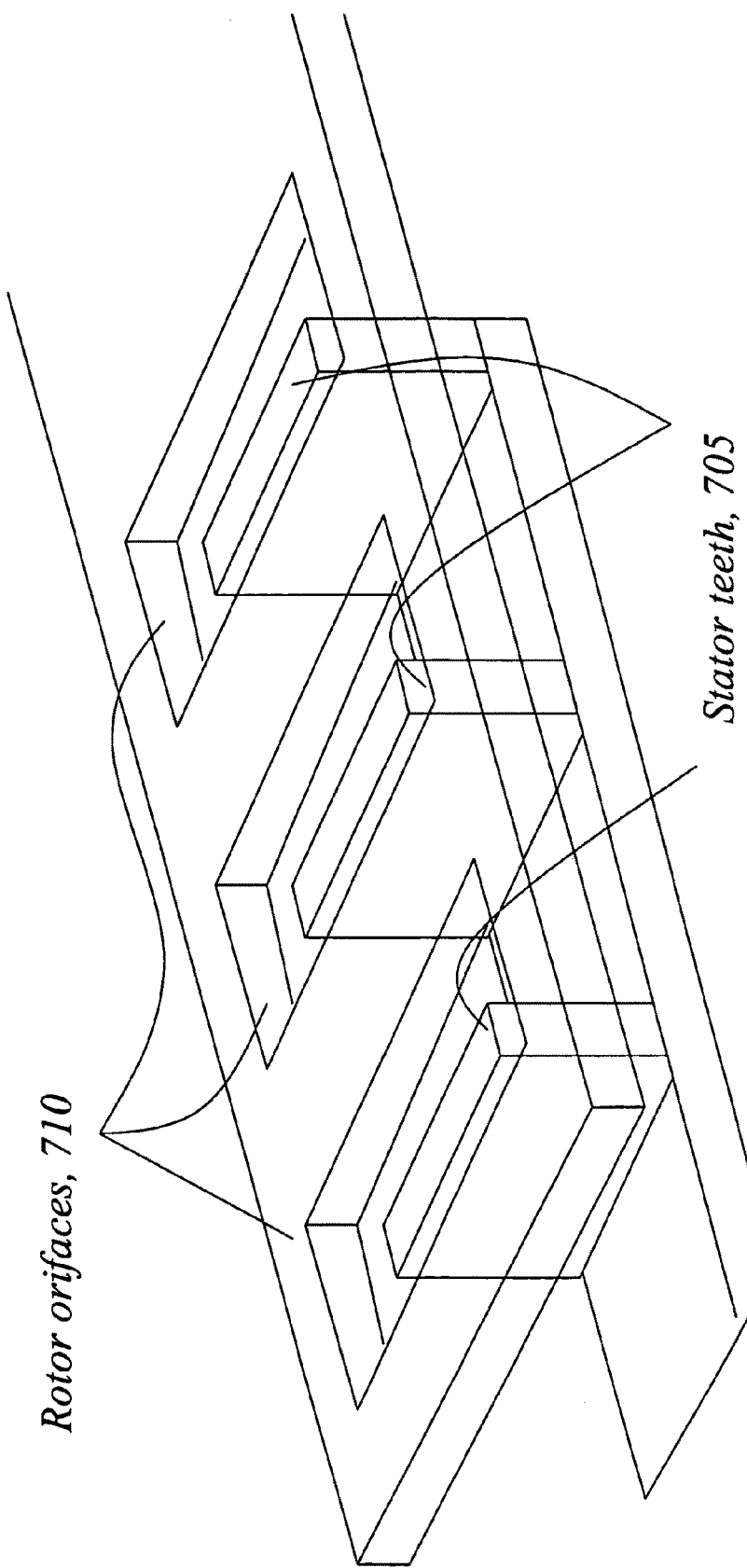
FIG. 7 is another alternative embodiment to the design shown in FIGS. 2 and 5 in which the stator fingers are electrically connected to each other by a lower trace of electrically conducting material.

An alternative embodiment to forming the "antenna" geometry along the stator electrodes is shown in FIG. 5 and FIG. 6, where the "antenna" structure 505 is formed on the rotor, with an interdigitated stator 510, with the remaining elements the same as shown in FIGS. 3A and 3B. A further alternative embodiment is shown in FIG. 7 where vertical stator teeth 705 are formed to be disposed within rotor orifices 710. The embodiments shown in FIGS. 5-7 are also desirable because they further limit cross talk from the fringing electric fields.

It can be appreciated from each of the foregoing alternative arrangements that the interdigitated portions—the stators and the rotors—are situated substantially in a direction parallel to the torsional hinge and the axis of rotation of the reflective element. Stated differently, one aspect of the present invention is the use of an interdigitated arrangement of electrodes for providing the capacitive forces necessary for angular rotation of the elements and which do not present the lateral snap-in phenomenon characteristic of at least some of the prior art. These embodiments of the present invention also have the benefit that they do not require the use of a self-alignment process.

Figure 8:
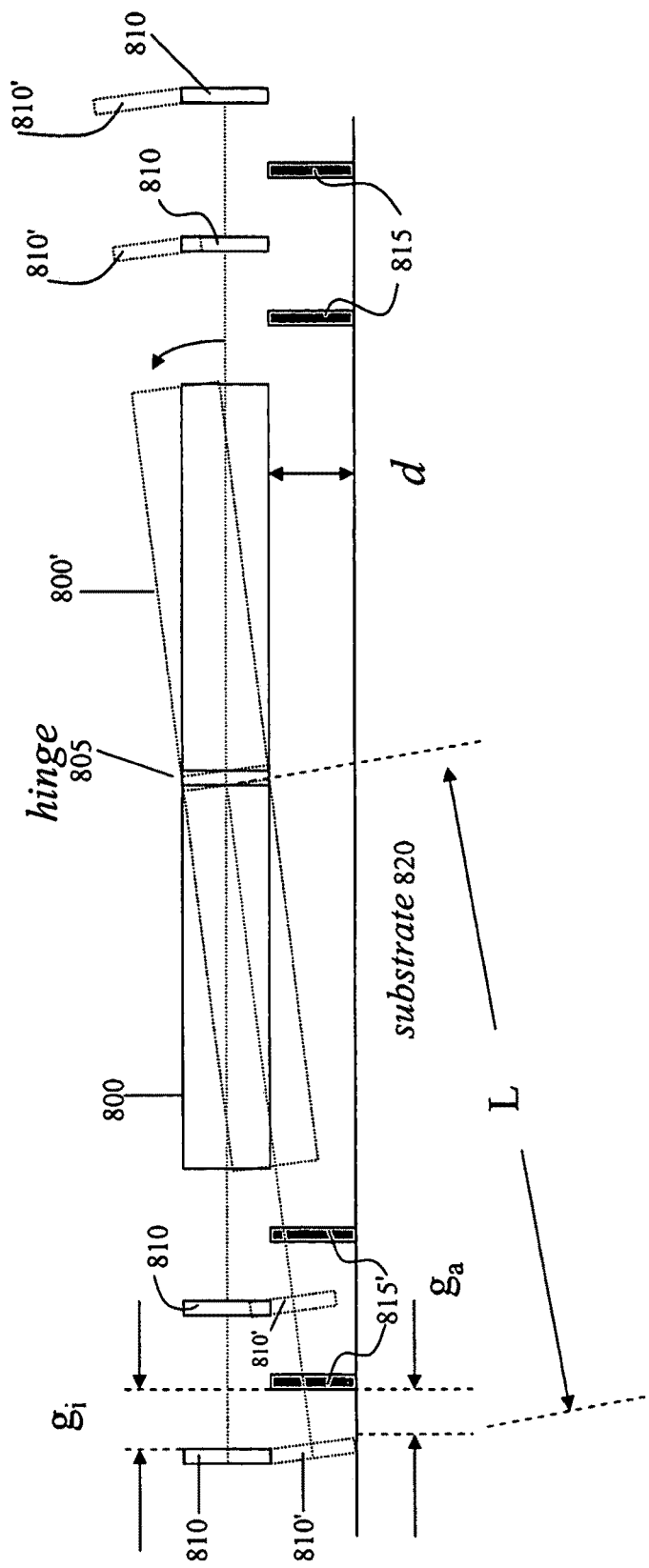
FIG. 8 is side view depiction of the change in gap between the rotor and the stator fingers during rotation.

As shown in FIG. 8, which illustrates the reflective element 800 and its hinge 805 in cross-sectional side view, at least certain arrangements of the present invention minimize the problem of mechanical interference between the interdigitated rotor and stator electrodes 810 and 815, respectively, at least for the small angles of rotation characteristic of such devices. More specifically, the reflective element 800 is limited in its range of motion a physical stop such as the substrate 820, before any portion of the rotor 810 can contact the stator 815, while still permitting actuation of up to several degrees of tilt.

Figure 11:
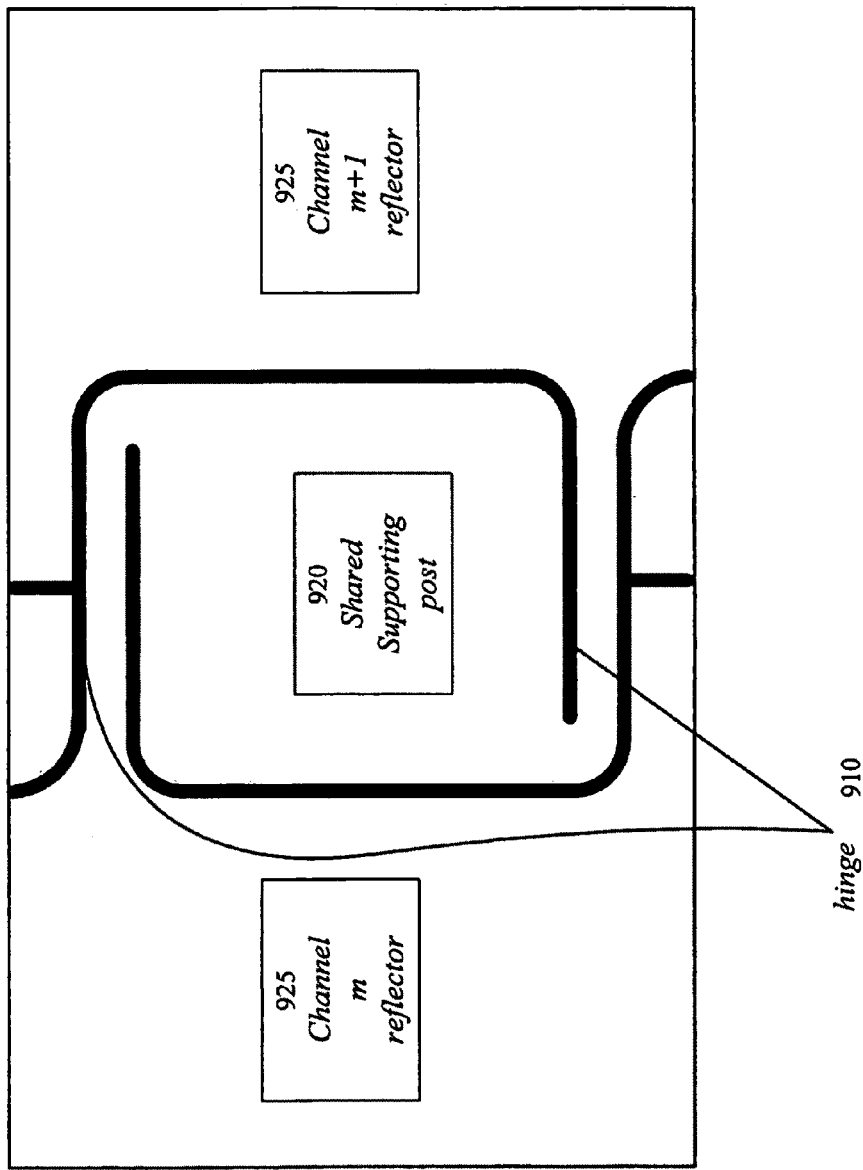
FIG. 11 is a top view of an exemplary embodiment of a hinge design folded around a supporting post and used to place actuators adjacent to each other.
Figure 12:
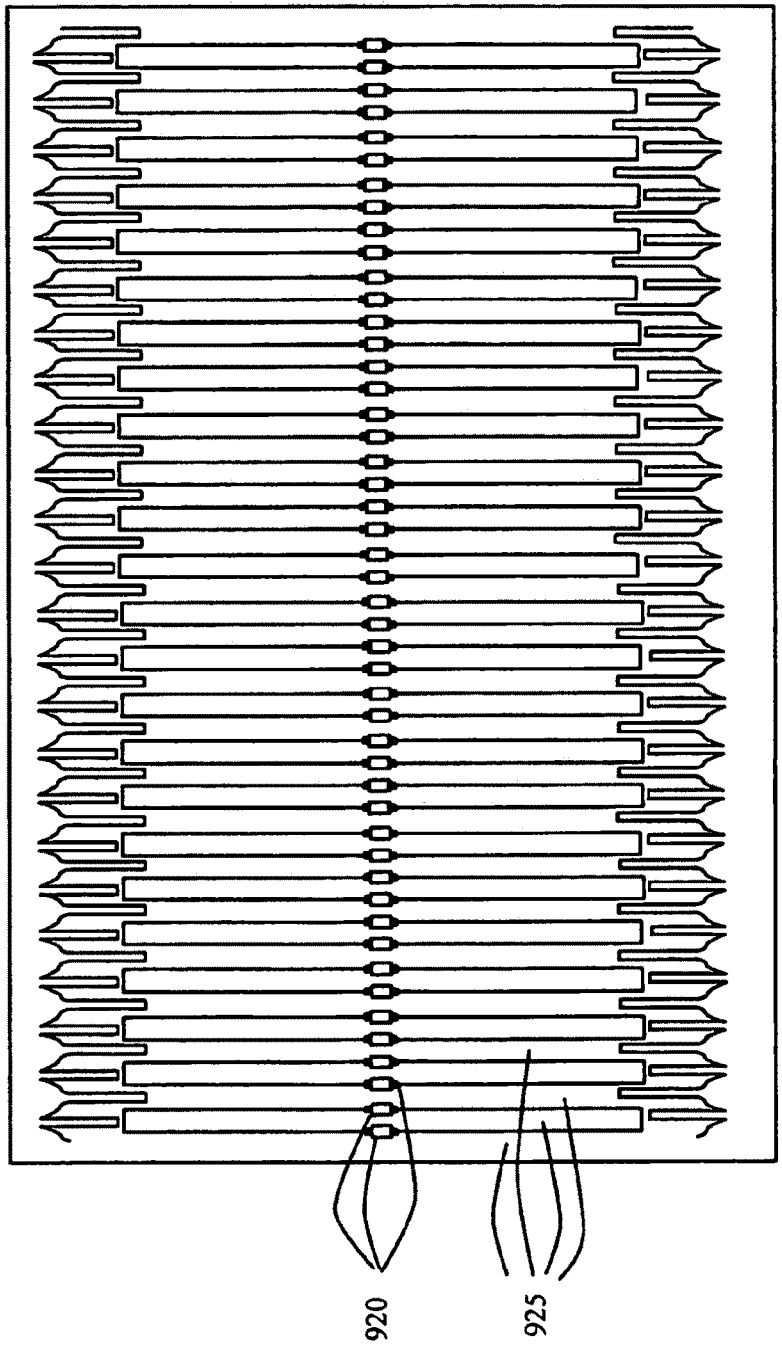
FIG. 12 illustrates one example of how the array of FIG. 10 can be extended to very large numbers of closely spaced actuators.
Figure 13:
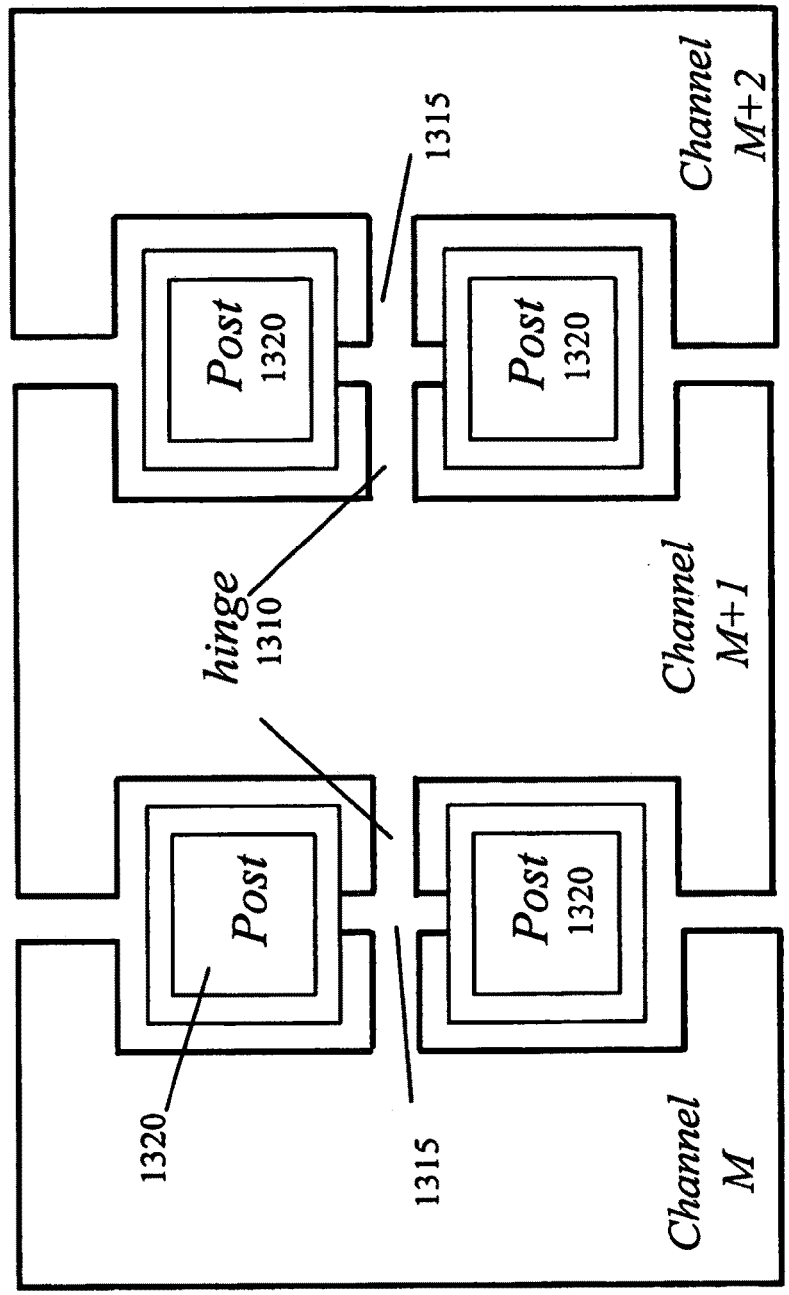
FIG. 13 depicts the top view of an alternative hinge design with a similar application to the preferred embodiment shown in FIG. 11.

A useful aspect of at least some embodiments of the invention is a high fill percentage. Stated differently, this aspect provides a decrease in the optical dead space in between each channel in order to increase the total spectral bandwidth associated with each wavelength channel impinging upon the micro steering array. This aspect can be appreciated from the hinge geometry shown in the FIGS. 9A-9B and 10, which illustrates an exemplary arrangement for at least some embodiments. In the arrangement of FIGS. 9A-9B and 10, hinges 910 are attached to the outside edges 915 of a post 920. Here the post 920 refers to the area used to anchor the steering element 925 to the substrate 930, with essentially symmetrical reflective steering areas 935 on either side of the post 920 in the illustrated embodiment, although such symmetry is not required in all embodiments. This geometry allows the steering elements 925 to be placed continuously in a single line (see FIG. 10) while minimizing the space taken up by the hinge 910 and the supporting post 920. This hinge design enables the posts 920 to be shared between adjacent steering elements 925 as shown in FIGS. 10 and 11 which in turn allows a large numbers of actuators, or steering elements, 925 to be spaced contiguously in a small area as shown in FIG. 12. An alternative hinge design is shown in FIG. 13 where the hinges 1310 intersect a central bridge point 1315 between two posts 1320. Steering elements with a linear fill factor as large as 98% have been achieved with both of the hinge post-sharing geometries depicted in FIG. 11 and FIG. 13.

Figure 14:
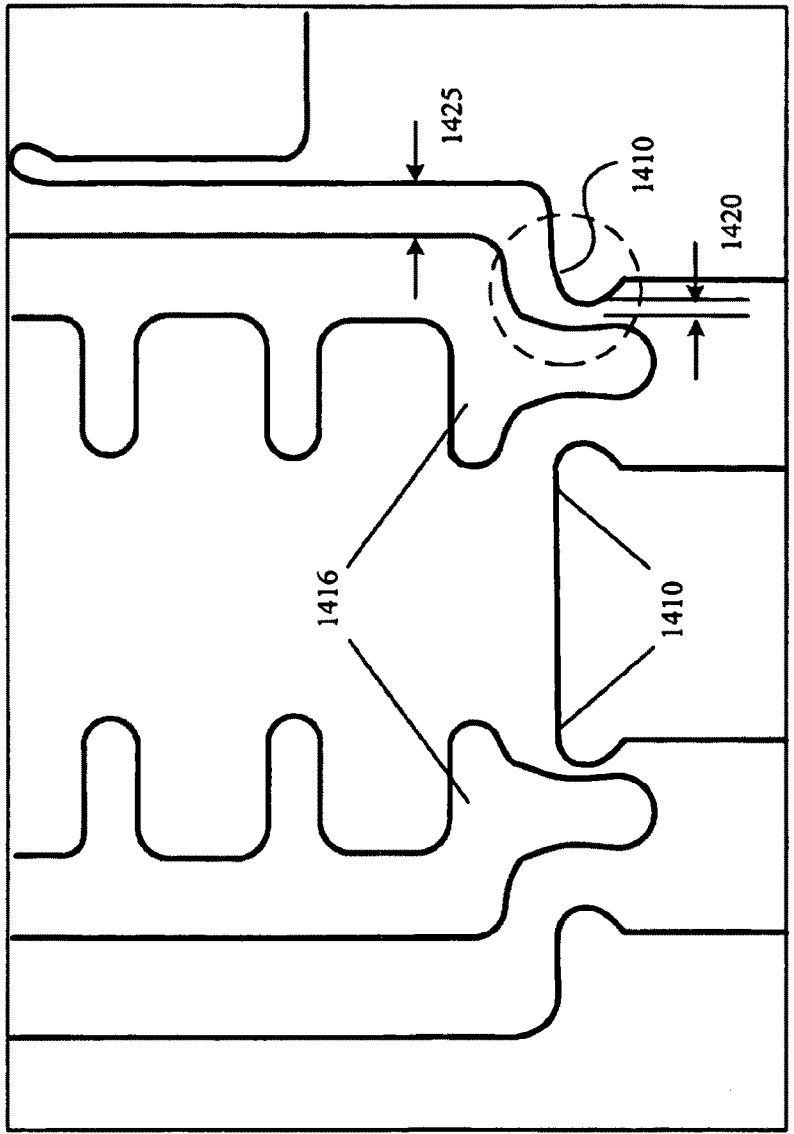
FIG. 14 illustrates a "stopper" placed near the end of the actuator to restrict lateral motion of the actuator during manufacturing processes and lateral shock testing by constricting the available space.
Figure 15:
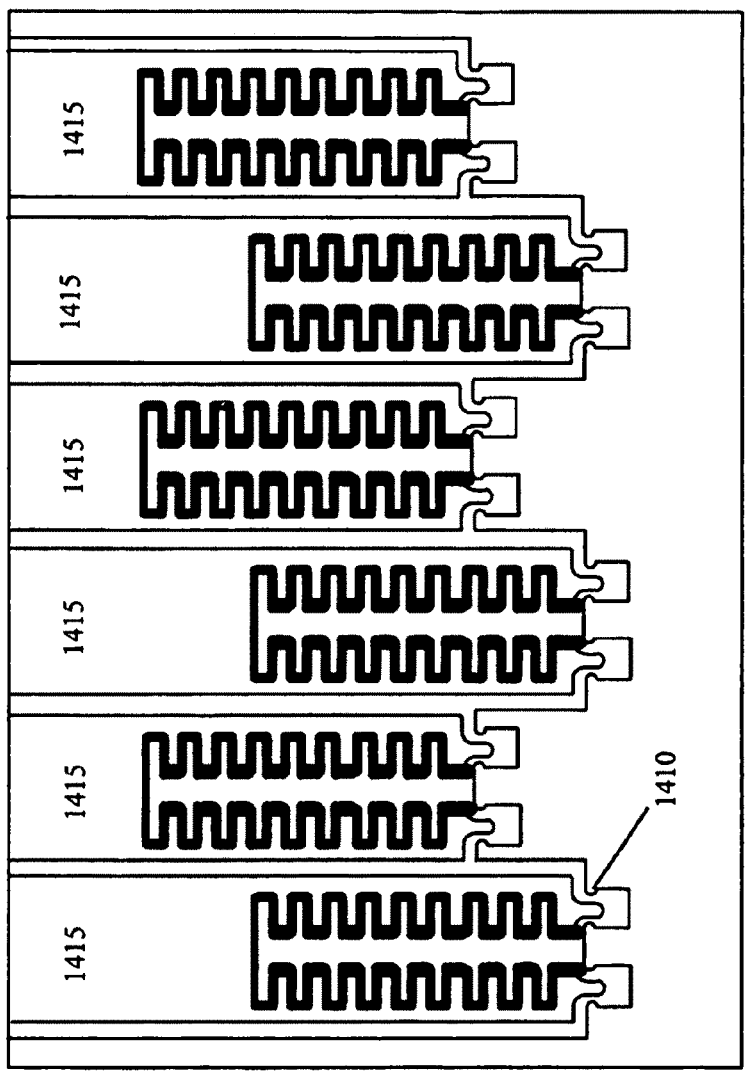
FIG. 15 illustrates an array of actuators with their associated nubs for restricting lateral motion

Another beneficial aspect of some embodiments of the present invention is the use of a carefully placed lateral "stopper" 1410 as shown in FIGS. 14 and 15 The purpose of the lateral stopper 1410 is to limit the lateral motion of the mirrors, or steering elements, 1415 during extreme mechanical shock testing or sudden pressure changes that may occur during unloading or loading wafers from a low pressure etching apparatus. Such pressure changes expose steering element and the end of the ends of rotor combs 1416 to a high degree of mechanical shock. In addition, these lateral stops 1410 provide an extra layer of safety by preventing stiction between adjacent actuators 1415. The distance 1420 between the stopper and wall is typically chosen to be less than or equal to the gap 1425 between adjacent steering elements 1415. In at least some embodiments, the use of such stoppers is helpful in providing a high yield, low cost design. It will be appreciated that, while the lateral stoppers 1410 are illustrated as formed external to the steering elements 1415, in at least some embodiments the stoppers 1410 could instead be formed on the steering elements.

Figures 16A, 16B:
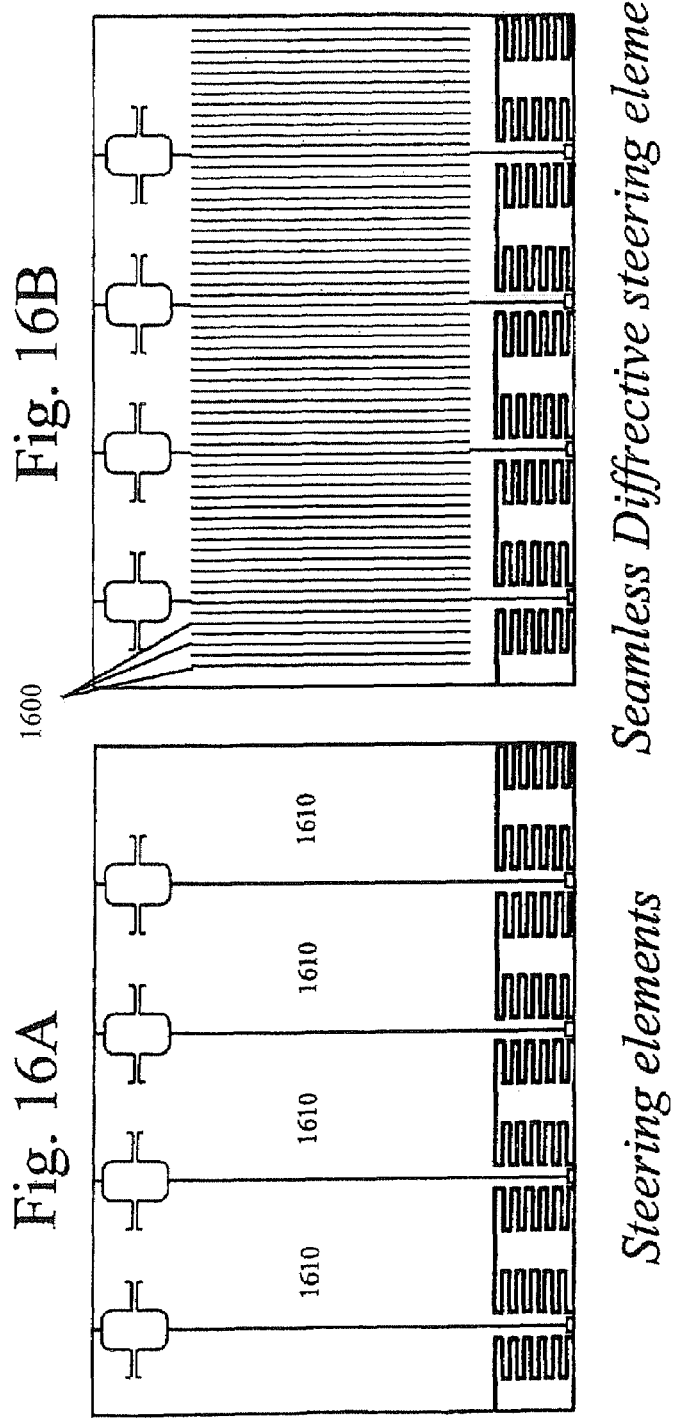
FIG. 16A shows an illustrative arrangement of a contiguous array of non-seamless actuators
FIG. 16B shows an illustrative arrangement of a contiguous array of seamless actuators.

Another aspect of the present disclosure, is that at least some embodiments of the invention are compatible with a diffractive steering approach that has seamless operation as discussed in U.S. patent application Ser. No. 10/371,907; filed Feb. 20, 2003, by Stowe et al. entitled System and Method for Seamless Spectral Control. In a diffractive steering approach, slots 1600 (only some of which are designated by a reference numeral for the sake of clarity) are cut into the array of steering elements 1610 as shown by a comparison of FIGS. 16A-16B, where FIG. 16A illustrates the steering elements 1610 in a simple arrangement while FIG. 16B illustrates the steering elements 1610 configured to operate as seamless diffractive application by the addition of the slots 1600. These slots 1600 are arranged to form a periodic amplitude grating which masks the transitions between channels, so that a Gaussian beam with a spot size larger than the period of the slot pattern will experience no optical transition in phase between two adjacent reflective elements actuated to steer the reflected light to the same output port with the same equalization. One aspect of diffractive steering is that, preferably, no electrical lines or structural connection should be underneath the reflective region unless those lines or connections are also periodic at the same frequency as the slot pattern. Thus, one advantage of this aspect of the invention is that none of the electrical signals needed to actuate the steering elements have traces underneath the reflective region. Instead these traces may be routed solely to the outside inter-digitated electrodes. The seamless approach allows a customer to group adjacent channels into optical sub-bands for added system flexibility. In addition this design allows seamless operation to be extended to 1×N wavelength switching devices, as desired for the particular implementation.

Figure 17A:
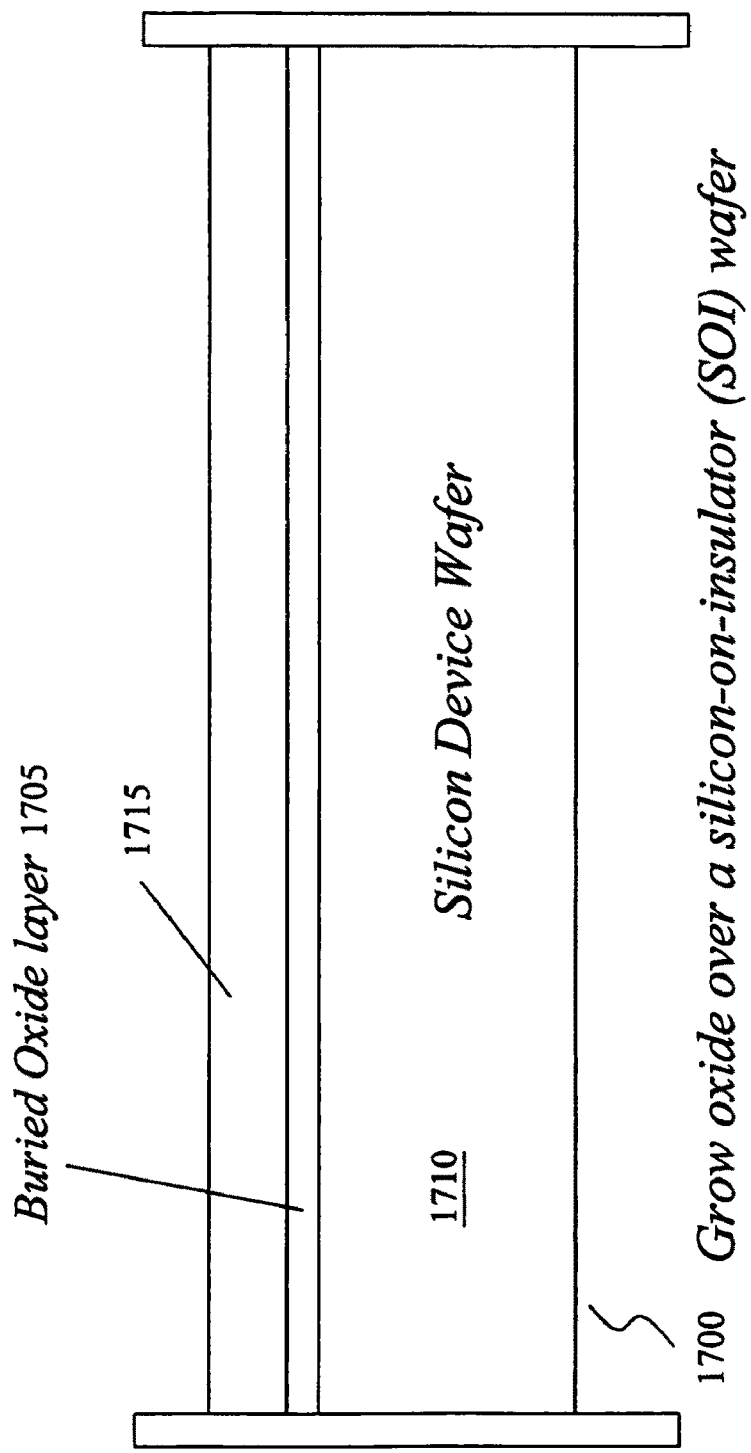

FIGS. 17A-17I, taken together with the process flow diagram of FIG. 18, show an exemplary set of fabrication steps for manufacturing one implementation of a micromechanical array in accordance with the present invention, for example that shown in FIG. 12. More specifically, FIG. 17A is a side view of a silicon-on-insulator (SOI) wafer 1700. Such a wafer 1700 serves as the starting material for forming a linear array of micromachined reflective steering elements in accordance with the present invention. Such a silicon on insulator wafer comprises a buried oxide layer 1705 that is positioned above a substrate 1710 and beneath a top silicon layer 1715.

Figure 17B:
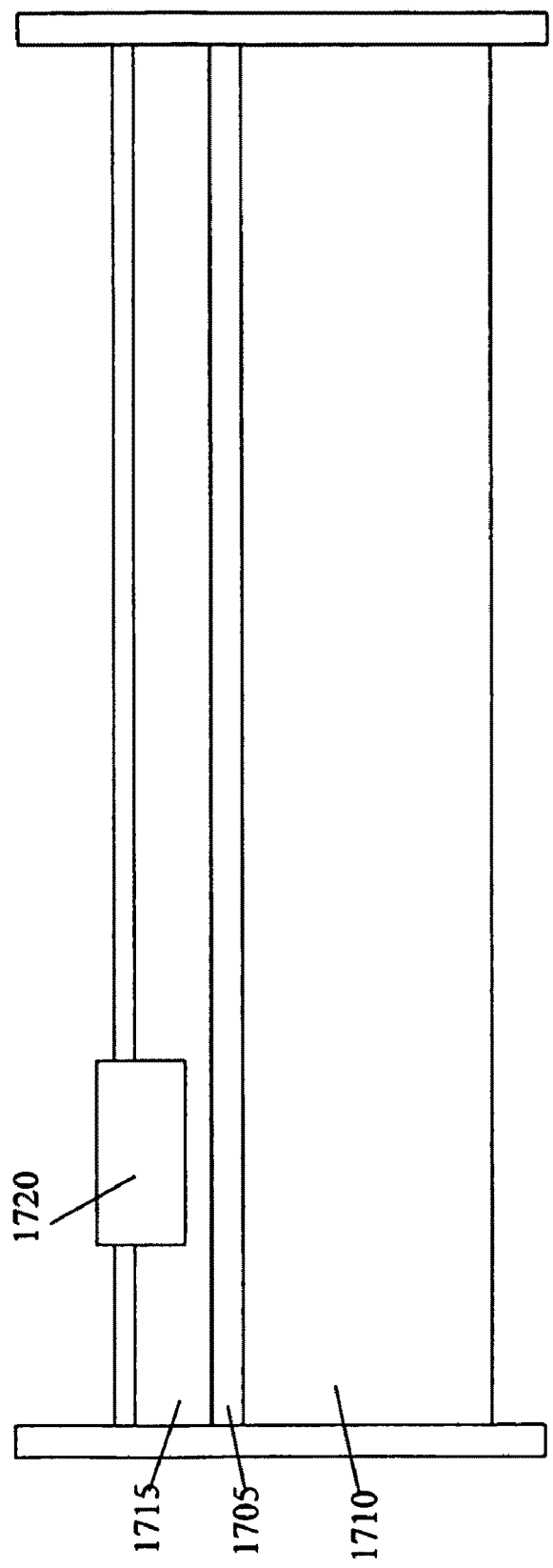
Figure 17D:
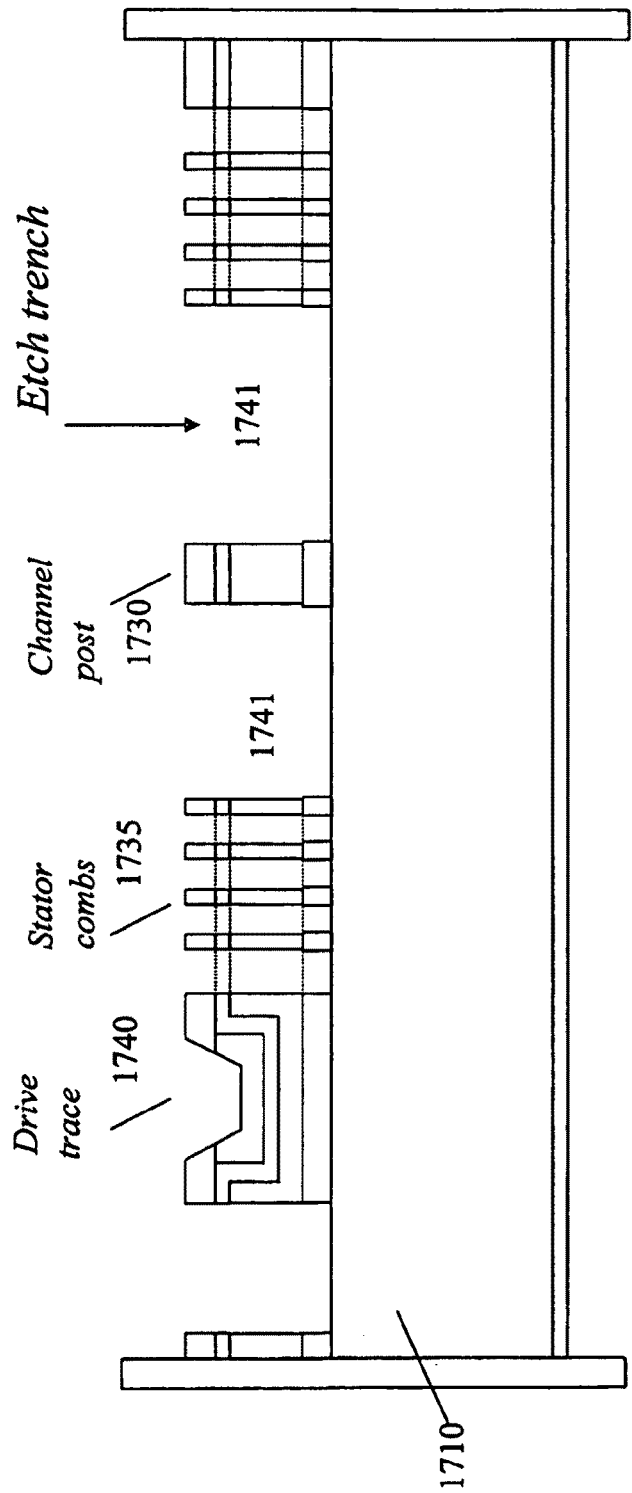

Referring next to FIG. 17B, a recess 1720 is patterned into the top silicon layer 1715 using a deep RIE etch that is masked by lithographically defined photoresist 1719. This recess 1720 is used later to form an electrical contact to the stator combs that are used to drive a steering element. Next, as shown in FIG. 17C, the SOI wafer 1700 is oxidized, creating layer 1725. The layer 1725 provides insulation during subsequent fusion bonding. Next, FIG. 17D shows the result when photoresist 1736 is lithographically exposed and this pattern is transferred into the top silicon layer using deep RIE. This pattern defines the channel posts 1730, stator combs 1735, and drive trace area 1740, as well as forming a cavity 1741 underneath each of the steering elements (as yet to be formed). In addition, a separate hole 1742 may be cut on the left side to allow a front side electrical contact to the bottom silicon 1710.

Figure 17E:
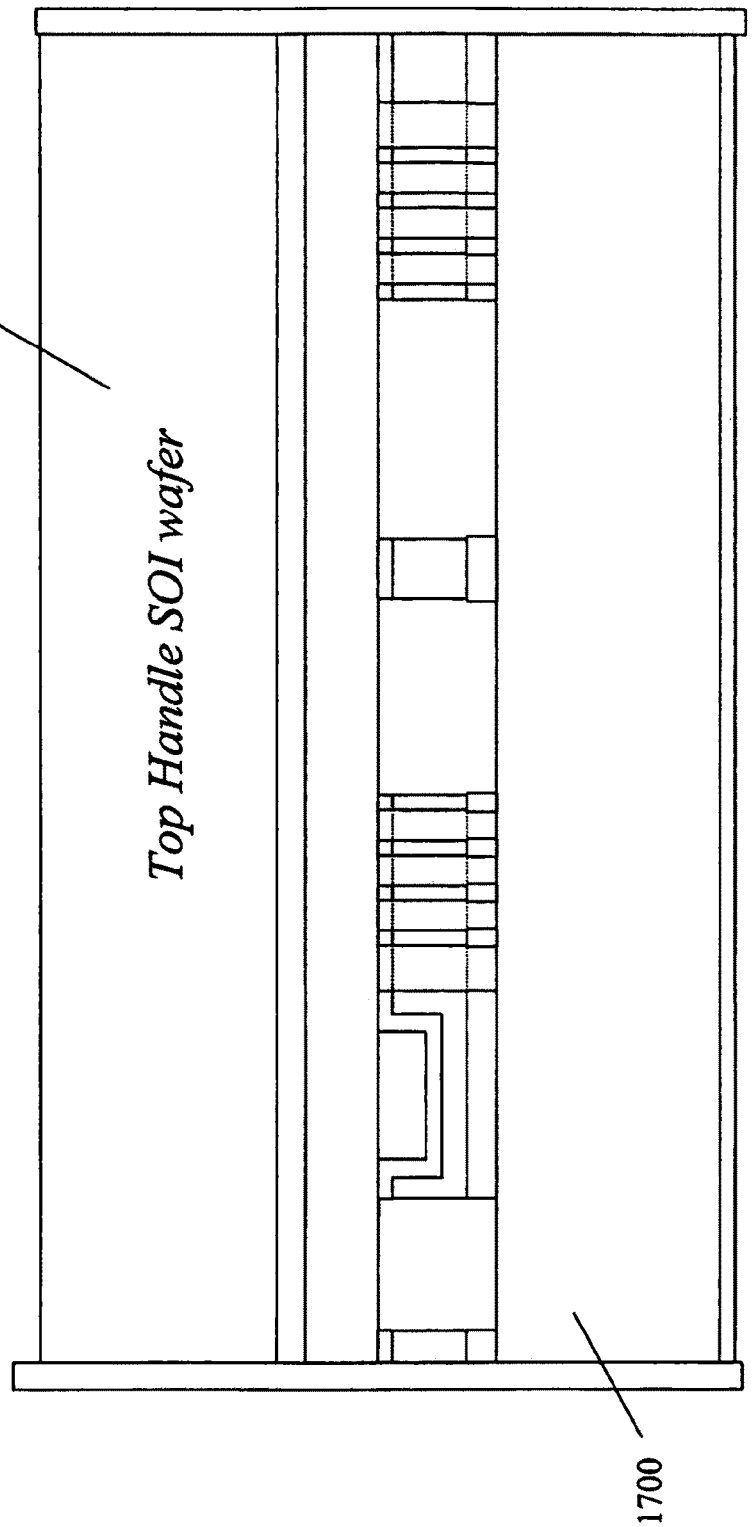
Figure 17F:
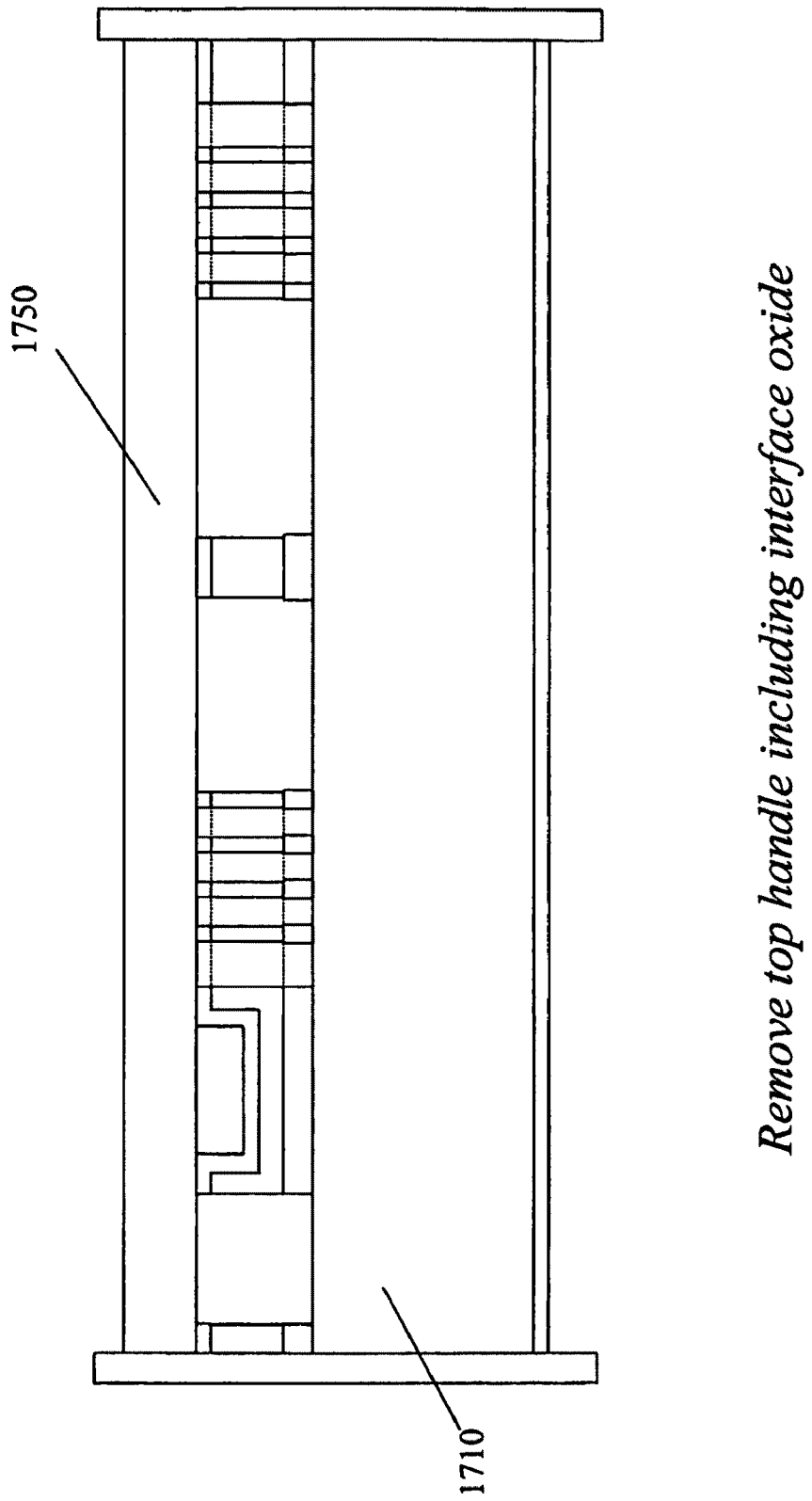
Figure 17G:
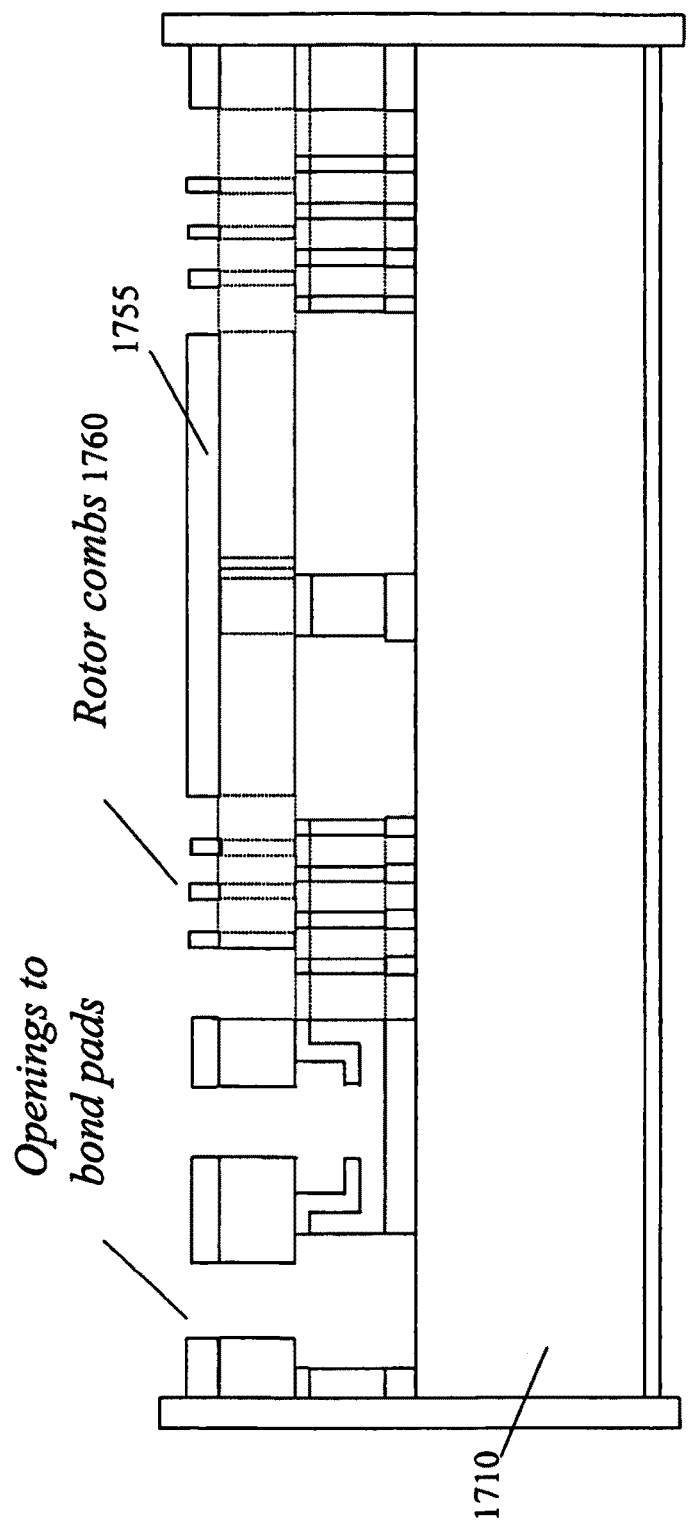

Next, as shown in FIG. 17E, another SOI wafer 1745 is fusion bonded to the patterned SOI wafer 1700, after which the top SOI handle wafer and buried oxide layer have been removed, as shown in FIG. 17F. This leaves a thin silicon membrane 1750 bonded to the bottom, and now patterned, SOI wafer 1700. Then photoresist is lithographically patterned and this pattern is transferred to the top silicon membrane 1750 and the underlying oxide using deep RIE. As shown in FIG. 17G, this defines the top steering elements 1755 together with their rotor combs 1760. Additional hole 1765 is opened to allow electrical access to the silicon ground plane 1710 as well as holes 1766 to the underlying stator combs 1735 used to drive each steering element 1755. Thereafter, the photoresist is removed with an $O_2$ plasma etch.

Next, FIG. 17H shows the shadow mask 1770 used to confine deposited bond pad metallization 1775 to the bond pad regions 1780. Finally, (FIG. 17I) a thin layer of reflective metal 1785 is deposited over the steering elements 1755 using another shadow mask 1790.

Figure 17I:
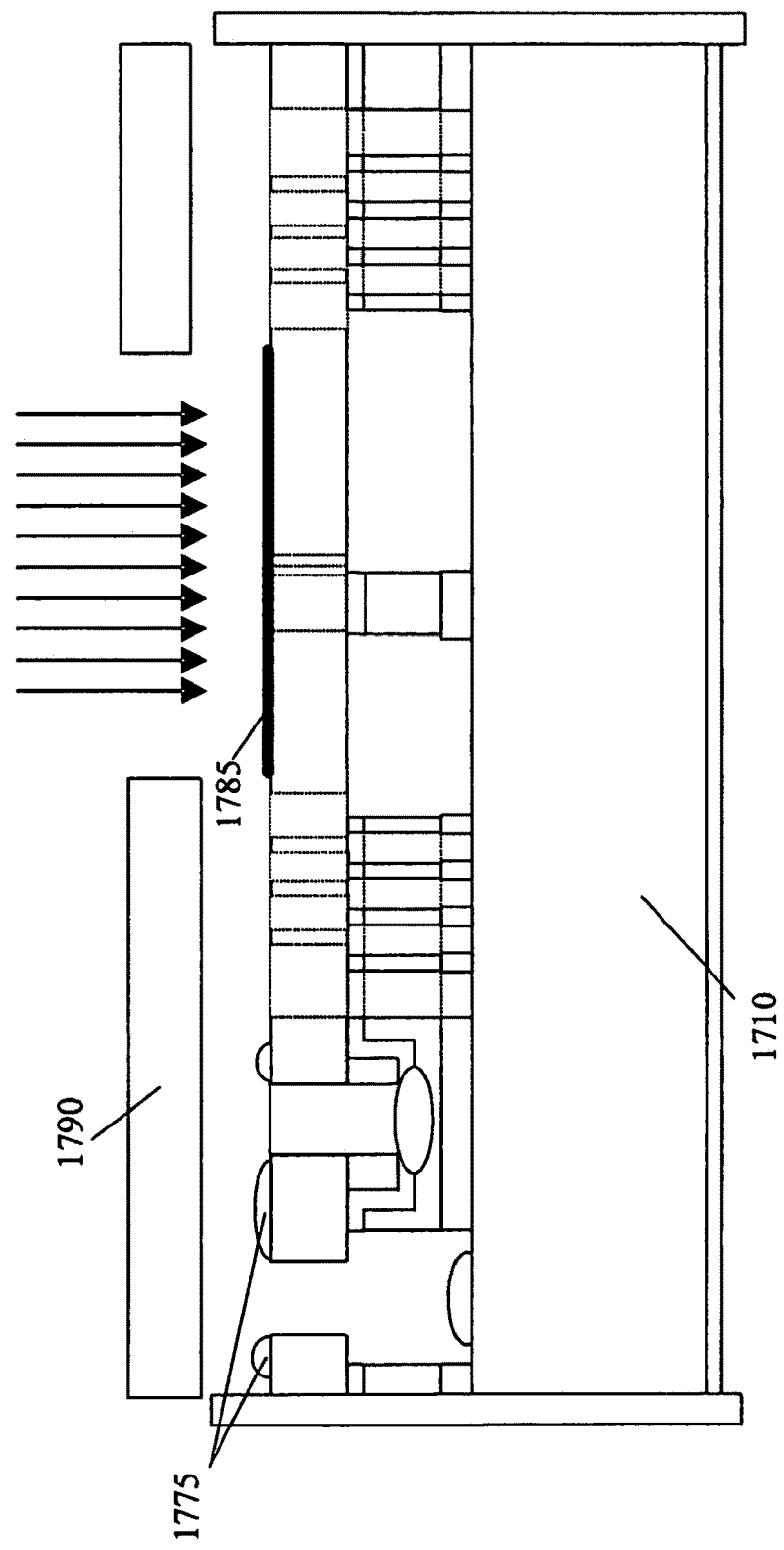

FIG. 18 illustrates a simplified process flow for building the structure shown in FIGS. 17A-17I. The process of FIG. 18 starts at step 1800 with a silicon-on-insulator (SOI) wafer. At step 1805, bond pad recesses are formed by means of lithography and etch. Then, at step 1810, initial oxidation occurs. At step 1815, the bottom stator, mechanical posts, and electrical traces are formed using lithography and etch techniques (oxide, silicon, oxide), followed at step 1820 by bonding of the upper SOI wafer, followed by an anneal. Next, at step 1825, the top handle wafer is etched away (see FIG. 17F) to remove the silicon and the oxide. At step 1835, the reflective elements and rotors are formed by means of lithography and etch processes (removal of silicon and oxide). Alternatively, a hard oxide mask may be used to form the reflective elements and rotors, wherein a masking oxidation is performed at step 1830, after which at step 1836 the reflective elements and rotors are formed by means of lithography and etch processes (again, removal of oxide, then silicon, then more oxide), and then at step 1840 an oxide etch is performed to remove the masking oxide. At step 1845 metal is evaporated and annealed to form bonding pads. Finally, at step 1850 the reflective metal layer is evaporated onto the appropriate regions (FIG. 17I). The process of FIG. 18 is then complete; however, those skilled in the art will recognize that different processing approaches may be used to yield the same structure, and thus this process is merely exemplary for one implementation of the structure of the present invention.

Referring briefly to FIG. 1C, it will be appreciated by those skilled in the art that, during the transition from switching a channel from port 1 to port 4, there is an intermediate point at which the light beam might pass through ports 2 and 3. In such event, a small transient signal would be seen in ports 2 & 3 when switching from ports 1 to 4. In some cases such transient effects can compromise the system architecture of a network system vendor. Thus a "hitless" means of switching between ports 1 and 4 is desirable such that no transient signals are seen in ports 2 or 3.

One possible means for providing hitless functionality involves attenuating the reflected amplitude of each wavelength channel during this transition. To achieve this, a liquid crystal array may be mounted on top of the micromechanical steering element array. FIG. 19 shows an exemplary arrangement for monolithically integrating a liquid crystal array 1910 for the purpose of attenuation during a switching event. Typically, this liquid crystal array 1910 is of the twisted nematic type with a thin sheet polarizer 1915 mounted either on the top or bottom of the stack. In addition, the cell sizes for each channel are lithographically matched in size to the spacing of micromechanical steering elements. In this embodiment, the liquid crystal elements 1910 can be bonded to the array of micromechanical steering elements with a small air gap 1920 by means of bonding posts 1925, with a transparent ITO electrode 1930 formed adjacent the liquid crystal array 1910 and an AR coated capping wafer 1935 positioned at the top of the stack. A typical substrate material for the liquid crystal array would be one such as Corning Pyrex 7740 or Borofloat (manufactured by Shot Glass) because their coefficients of thermal expansion are directly matched to silicon. Additionally, the preferred embodiment would try to minimize the total stack height between the liquid crystal and steering element array in order to keep the elements within the Rayleigh range of the collimated Gaussian beam of light impinging on each channel. While the above-described structure works in principle, it requires a complicated system of alignment and complicated routing of two sets of drive signals, one set for the liquid crystal array and one set for the micromechanical steering elements.

A simpler method for implementing hitless operation is to form an array of biaxial steering elements that can be tilted along the axis perpendicular to the length of the array (hereinafter the "$\theta_x$" direction). As depicted in FIG. 20, the effect of tilting the steering elements along this direction is to cause the return path of the light to be laterally displaced along the direction transverse to the array of output fibers. Thus, when a beam is redirected from output port 1 to 4 (labeled as elements 2005 and 2020 respectively) by changing the steering element angle along $\theta_y$, the beam can also be simultaneously displaced laterally by tilting the MEMS steering element along the $\theta_x$ direction such that the beam misses the intermediate port 2 and port 3 (labeled as elements 2010 and 2015 respectively). The hitless path of the return beam takes during switching is shown as the dotted line 2000. Thus, hitless operation can be accomplished by simultaneously steering light along orthogonal angular directions $\theta_x$ and $\theta_y$ in a single linear array. In some cases the tilt necessary to achieve hitless performance along the perpendicular $\theta_x$ direction may be as much as five degrees.

Such a micromechanical design is challenging if the requirement for a high fill factor is maintained, as it may be in at least some embodiments. FIG. 21 illustrates a top view of a steering element 2100 designed to tilt along both $\theta_x$ and $\theta_y$ directions simultaneously. This design eliminates the need for complicated routing underneath the reflective steering elements. In this arrangement, the steering element 2100 is made from a central reflective mirror element 2110 mechanically linked to two outside steering actuators 2120 and 2121 by four flexural joints 2140, 2141, 2142 and 2143. Both surrounding actuators have a similar arrangement of stator and rotor comb geometry as described earlier in FIG. 6 and can be constructed by process steps similar to those described in FIGS. 17 and 18. In addition, in an exemplary arrangement, the steering actuators may use all of the design points concerning the folding of hinges around the posts as described in connection with FIGS. 9-13. The four flexural joints 2140-2143 comprise serpentine mechanical linkages that are primarily compliant enough to allow angular twisting along $\theta_y$ between the central reflective mirror and the outside steering actuators. It is advantageous, in at least some embodiments, to make these linkages thin enough so that the central reflector experiences no warping during actuation. Because the $\theta_y$ steering actuators are joined to the central reflective mirror in this compound configuration, the angular range of motion of the central mirror can be magnified along the $\theta_y$ direction by choosing the appropriate arm lengths of the central reflector and surrounding torsional actuators. For this to occur, the motion of both actuators 2120 and 2121 are driven in the same direction in the illustrated arrangement. Such motion is depicted from the side view in FIG. 22 where the linkages are shown in their relaxed 2240 and unrelaxed states 2240'. All four linkages are assumed thin enough to flex without causing warping in the central reflector region 2210. By torsionally pulling on both outside actuators 2220 and 2230 about their respective hinges 2250 and 2260, the central reflector is twisted about $\theta_y$.

An additional aspect of the four linkages is that they can be thermally actuated to provide a twisting mechanism for motion $\theta_x$. In order to accomplish this motion, which may be desirable in some embodiments, a one-to-two micron thick metal layer is shadow mask deposited on top of all four flexural linkage joints. It is possible to put this layer down at the same time that aluminum is put down for the bond pad connections discussed in FIG. 17H. This evaporated metal forms a bimorph structure that allows out-of-plane movement to occur at these linkages when they are heated to a different temperature. Finally, a highly conductive path may be formed along the dashed line originating at 2160 and terminating at 2165. This path may, for example, be created by ion implantation before the mirror regions and top rotor combs are cut. The purpose of this path is allow a current to flow predominately through the top two linkages 2142 and 2143; thus heating the top two linkages more than the bottom two linkages 2140 and 2141, causing a larger out-of-plane displacement in the top two linkages as compared to the bottom two linkages. Because heat is initially concentrated on these top linkages there is a differential change in the curvature of the top linkages over the bottom linkages. This then leads to a twisting motion in the central steering element as best depicted in the isometric view shown in FIG. 23. Here 2310 shows the relaxed state of the mirror and 2310' shows the energized state with current flow on and current flowing predominately through the top two linkages 2322 and 2323. The four linkages 2320, 2321, 2322, and 2323 are drawn with a smaller number of folds than shown in FIG. 21 for visual clarity. Once this current is turned off heat diffuses through the entire structure causing the central steering element to return to its equilibrium position. Simple modeling shows that the time constant for tilting the reflective element along the $\theta_x$ direction is limited by the thermal time constant for heat to diffuse down the legs. Designs can be easily achieved which operate with less than 20 degrees Celsius increase from ambient temperature, a few milliseconds of switching time, and with less than 1 mW of input power. Finally, the symmetry of the structure eliminates changes in tilt along $\theta_x$ to changes in the background temperature as no tilt is induced if both the top and bottom linkages are at the same temperature. Because the steering element structure has geometric symmetry it can be designed to balance moments of inertia so there is no net torque about the center of mass due to mechanical shock and external vibration along all three orthogonal axes.

FIG. 24 shows three biaxial steering elements placed next to each other. In a typical arrangement, the torsional actuators at each end may be constructed using the design elements and process flow already disclosed in this invention, although it will be appreciated by those skilled in the art that such an approach is not required for all embodiments. Each of the right most comb drive actuators 2461, 2462, and 2463 (to the right of the central reflective elements 2410, 2420, and 2430) can share adjacent posts 2471 and 2472 and a common input current path 2240. An electrical switch such as an analog demultiplexer can be used to selectively open or close the individual output current paths 2450, 2451, and 2452 of each individual steering element. It will be apparent to those skilled in the art, given the teachings herein, that additional elements can be placed next to each other to form a linear array of n steering actuators capable of steering the light along two orthogonal directions.

Having fully described an exemplary arrangement and various alternatives, it will be appreciated by those skilled in the art that numerous alternatives and equivalents exist which do not depart from the invention. It is therefore intended that the present invention not be limited by the foregoing description, but only by the appended claims.

What is claimed is:

1. An optical steering element comprising:
   a reflective element;
   a torsional hinge attached substantially at the centerline of the reflective element, the hinge defining an axis of rotation;
   a plurality of rotor comb fingers formed integrally with the reflective element; and,
   a plurality of stator comb fingers interdigitated with the rotor comb fingers;
   wherein the rotor comb fingers and stator comb fingers are situated substantially parallel to the hinge and to the axis of rotation of the reflective element about which the plurality of rotor comb fingers rotate relative to the plurality of stator comb fingers.

2. The steering element of claim 1 wherein the stator comb fingers are formed in an antenna geometry.

3. The steering element of claim 1 wherein the rotor comb fingers are formed in an antenna geometry.

4. The steering element of claim 1 wherein the reflective element is coated with a layer of reflective metal.

5. The steering element of claim 1 wherein the reflective element is limited in its range of motion by a stop such that the rotor cannot touch the stator.

6. An optical steering element comprising:
   a reflective element;
   a torsional hinge attached substantially at the centerline of the reflective element, the hinge defining an axis of rotation;
   a plurality of rotor orifices formed integrally with the reflective element; and,
   a plurality of stator teeth disposed within the rotor orifices;
   wherein the rotor orifices and stator teeth are situated substantially parallel to the hinge and the axis of rotation of the reflective element, and
   wherein each of the plurality of rotor orifices completely enclose a perimeter of the stator teeth.

7. A wavelength selective switch comprising:
   a 1 by N microcollimator array that collimates N light beams;
   a diffraction grating that separates the light beams into individual wavelength channels; and,
   an achromatic lens that focuses the wavelength channels onto an array of optical steering elements, each element comprising:
   a reflective element;
   a torsional hinge attached substantially at the centerline of the reflective element, the hinge defining an axis of rotation;
   a plurality of rotor comb fingers formed integrally with the reflective element; and,
   a plurality of stator comb fingers interdigitated with the rotor comb fingers;
   wherein the rotor comb fingers and stator comb fingers are situated substantially parallel to the hinge and the axis of rotation of the reflective element relative to the plurality of stator comb fingers.

8. The switch of claim 7 further comprising: a turning mirror whose angle can be controlled as a function of temperature.

* * * * *

UNITED STATES PATENT AND TRADEMARK OFFICE
CERTIFICATE OF CORRECTION

| | | |
|---|---|---|
| PATENT NO. | : 7,529,444 B2 | |
| APPLICATION NO. | : 11/807461 | |
| DATED | : May 5, 2009 | |
| INVENTOR(S) | : Timothy D. Stowe, Jocelyn Nee and Asif A. Godil | |

It is certified that error appears in the above-identified patent and that said Letters Patent is hereby corrected as shown below:

Delete drawing sheets 5, 29 & 30, replace with new drawing sheets 5, 29 & 30. (Attached)

Signed and Sealed this

Fourth Day of August, 2009

JOHN DOLL
*Acting Director of the United States Patent and Trademark Office*

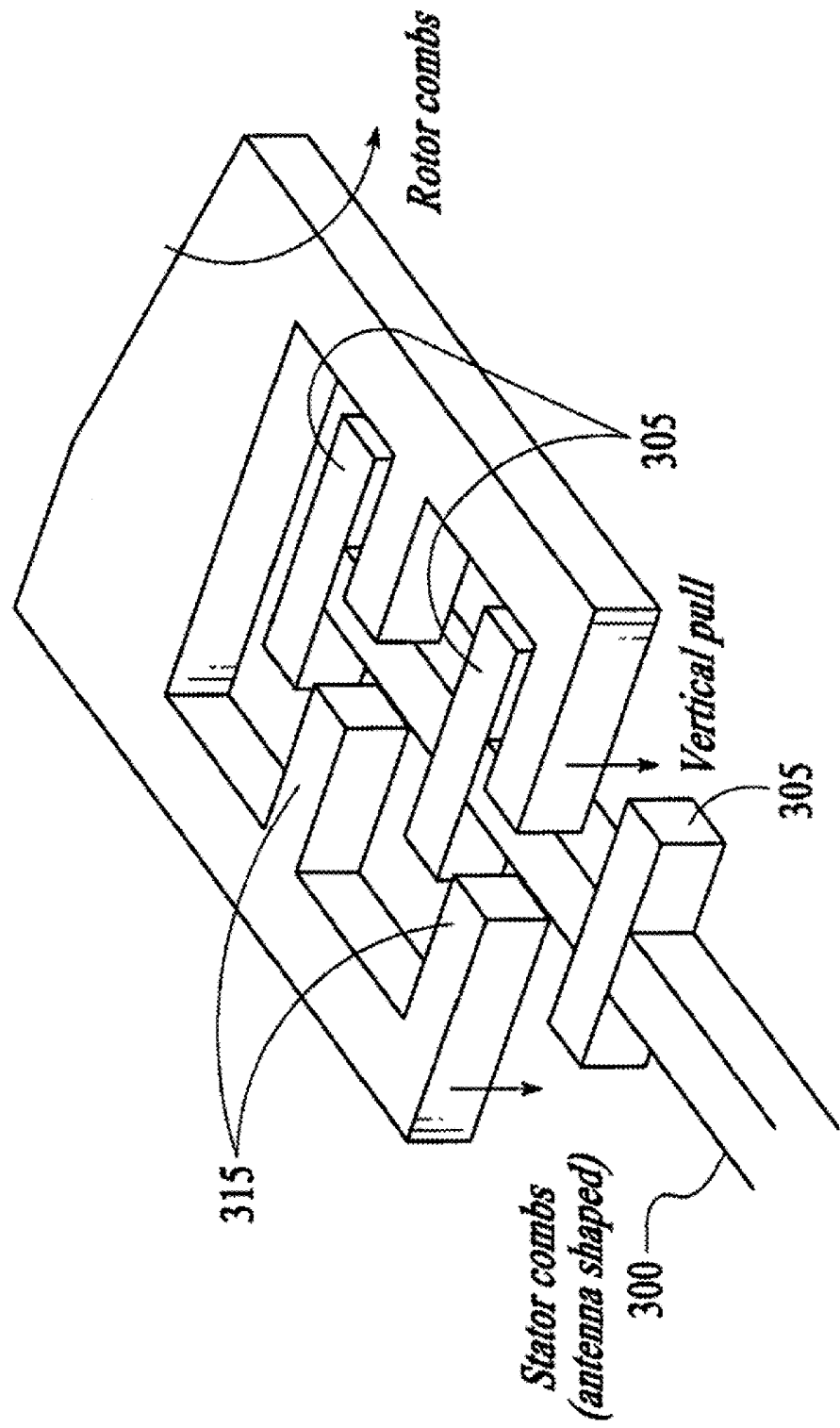

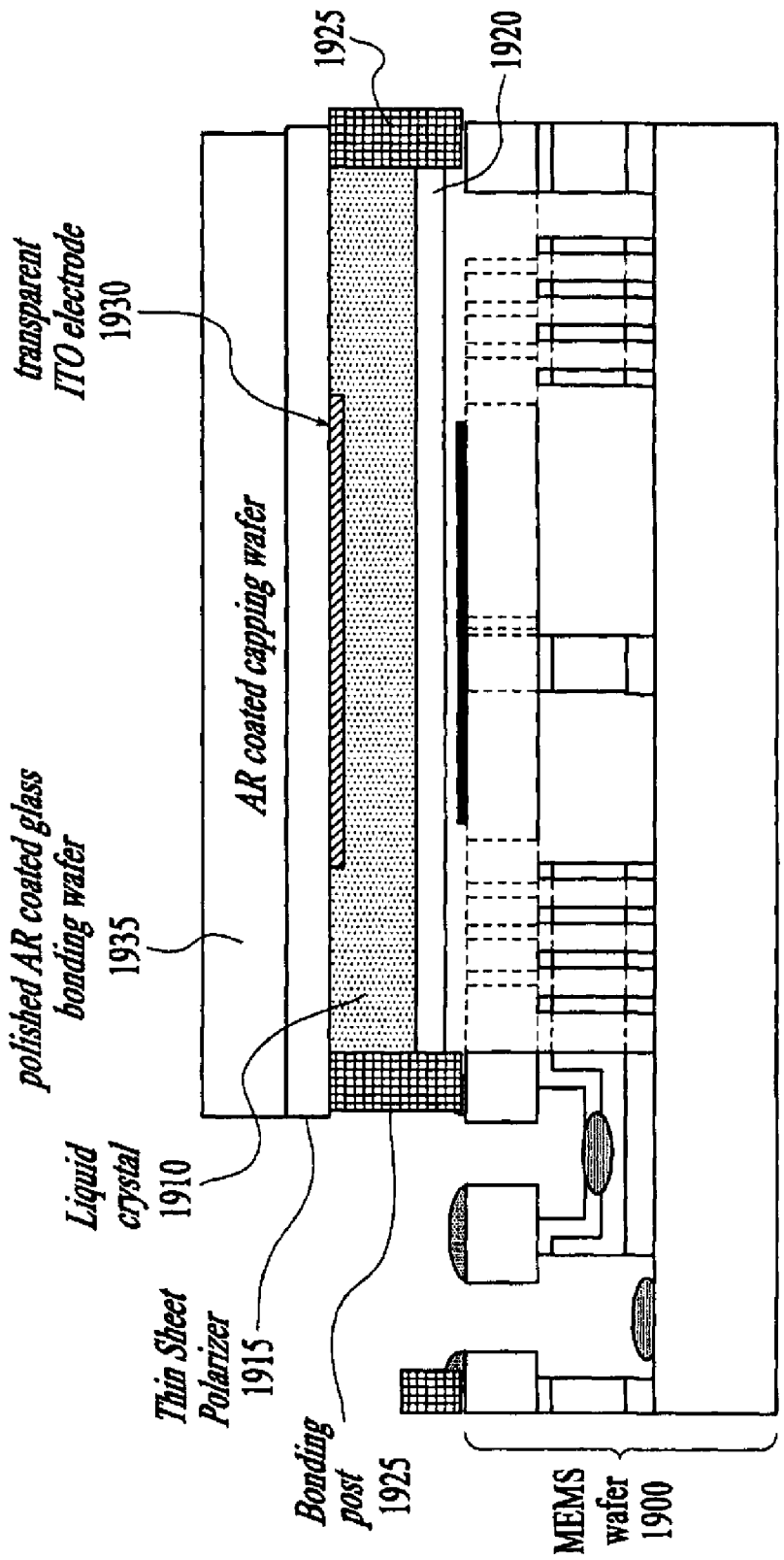
FIG.19 *Liquid Crystal monolithically bonded to steering element array*